(12) United States Patent
Clothier et al.

(10) Patent No.: US 10,365,909 B2
(45) Date of Patent: Jul. 30, 2019

(54) METHOD AND SYSTEM FOR DEPLOYING VIRTUALIZED APPLICATIONS

(71) Applicant: DATA ACCELERATOR LTD, London (GB)

(72) Inventors: Mathew P. Clothier, Chedzoy (GB); Priya Saxena, Ilford (GB); Saurabh Karmarkar, Ilford (GB); Odyssefs Venieris, Acton (GB); Matthew Keen, Fulham (GB)

(73) Assignee: Data Accelerator LTD., London (GB)

( * ) Notice: Subject to any disclaimer, the term of this patent is extended or adjusted under 35 U.S.C. 154(b) by 0 days.

(21) Appl. No.: 15/490,583

(22) Filed: Apr. 18, 2017

(65) Prior Publication Data

US 2017/0308367 A1 Oct. 26, 2017

Related U.S. Application Data

(60) Provisional application No. 62/325,933, filed on Apr. 21, 2016.

(51) Int. Cl.
*G06F 8/61* (2018.01)
*G06F 9/445* (2018.01)
*G06F 9/455* (2018.01)

(52) U.S. Cl.
CPC .............. *G06F 8/61* (2013.01); *G06F 9/445* (2013.01); *G06F 9/44536* (2013.01); *G06F 9/45504* (2013.01)

(58) Field of Classification Search
CPC ..... G06F 8/61; G06F 9/44536; G06F 9/45504
(Continued)

(56) References Cited

U.S. PATENT DOCUMENTS 6,253,369 B1 * 6/2001 Cloud .................... G06F 9/546
717/136
6,546,554 B1 * 4/2003 Schmidt .............. G06F 9/44526
717/177

(Continued)

OTHER PUBLICATIONS

Victor et al., "Application platforms for embedded systems: Suitability of J2ME and .NET Compact Framework", 2006, Research and Practice (Year: 2006).*

(Continued)

*Primary Examiner* — Wei Y Zhen
*Assistant Examiner* — Junchun Wu

(57) ABSTRACT

Methods and systems for deploying virtualized applications are disclosed. In an embodiment, a method involves, at a client device, downloading a launcher from a virtualized application portal to the client device, running the launcher at the client device, wherein running the launcher comprises checking for a first dependency and downloading a file of the first dependency if the first dependency is not installed on the client device, after checking for the first dependency, downloading an apploader from the virtualized application portal, and running the apploader at the client device. Running the apploader involves determining a configuration of the client device and downloading virtualized application components dependent on the configuration, determining specific needs of the virtualized application and downloading components dependent on the specific needs, and starting the virtualized application on the client device.

18 Claims, 13 Drawing Sheets

(58) Field of Classification Search
USPC .................................................. 717/178
See application file for complete search history.

(56) References Cited

U.S. PATENT DOCUMENTS

| | | | | |
|---|---|---|---|---|
| 7,886,021 B2* | 2/2011 | Scheifler | ............... | G06F 9/485 709/217 |
| 8,286,147 B2* | 10/2012 | Alpern | ............... | G06F 9/44521 717/138 |
| 8,560,709 B1* | 10/2013 | Shokhor | ............... | H04L 63/20 709/203 |
| 8,626,806 B2* | 1/2014 | Larimore | ............ | G06F 9/45537 717/175 |
| 9,053,340 B2* | 6/2015 | Borzycki | ............ | G06F 21/6218 |
| 9,201,671 B2* | 12/2015 | Vincent | .............. | G06F 9/45558 |
| 9,471,367 B1* | 10/2016 | Hu | ..................... | G06F 9/45558 |
| 9,521,147 B2* | 12/2016 | Barton | ................... | H04L 41/00 |
| 2005/0223101 A1* | 10/2005 | Hayes, Jr. | ................ | G06F 8/60 709/228 |
| 2006/0123415 A1* | 6/2006 | Dandekar | ............... | G06F 8/61 717/177 |
| 2009/0199175 A1* | 8/2009 | Keller | ...................... | G06F 8/61 717/178 |
| 2009/0300151 A1* | 12/2009 | Friedman | ............ | G06F 11/3664 717/120 |
| 2010/0037211 A1* | 2/2010 | Zakonov | ............ | G06F 11/3604 717/130 |
| 2010/0131943 A1* | 5/2010 | Sreekanth | ................ | G06F 8/61 717/176 |
| 2010/0251263 A1* | 9/2010 | Coelho | ............. | G06F 11/3433 719/314 |
| 2011/0016414 A1* | 1/2011 | Ernst | ........................ | G06F 8/61 717/174 |
| 2011/0047540 A1* | 2/2011 | Williams | ................ | G06F 8/61 717/178 |
| 2011/0154341 A1* | 6/2011 | Pueyo | ................... | G06F 9/5066 718/101 |
| 2011/0179405 A1* | 7/2011 | Dicks | ........................ | G06F 8/61 717/168 |
| 2012/0088584 A1 | 4/2012 | Mamtani et al. | | |
| 2012/0110601 A1* | 5/2012 | Spencer | ................. | G06F 9/445 717/178 |
| 2012/0192174 A1* | 7/2012 | Tsuboi | .................... | G06F 8/61 717/176 |
| 2013/0046585 A1* | 2/2013 | Bang | ........................ | G06F 8/20 717/103 |
| 2013/0061217 A1* | 3/2013 | Charters | ................... | G06F 8/61 717/174 |
| 2013/0346964 A1* | 12/2013 | Nobuoka | .................. | G06F 8/61 717/177 |
| 2015/0150025 A1* | 5/2015 | Yuen | ....................... | G06F 9/54 719/312 |
| 2017/0060605 A1 | 3/2017 | Huang et al. | | |
| 2017/0147316 A1 | 5/2017 | Reierson et al. | | |
| 2017/0243001 A1 | 8/2017 | Jawa et al. | | |

OTHER PUBLICATIONS

Lee et al., "Design and Implementation C Based Lightweight Component Framework", 2006, IEEE (Year: 2006).*

Cruz et al., "Offloading approach for flexible provisioning and execution of remote data-gathering applications", 2011, IEEE (Year: 2011).*

Soroker et al., "Pegboard: A Framework for Developing Mobile Applications", 2006, ACM (Year: 2006).*

* cited by examiner

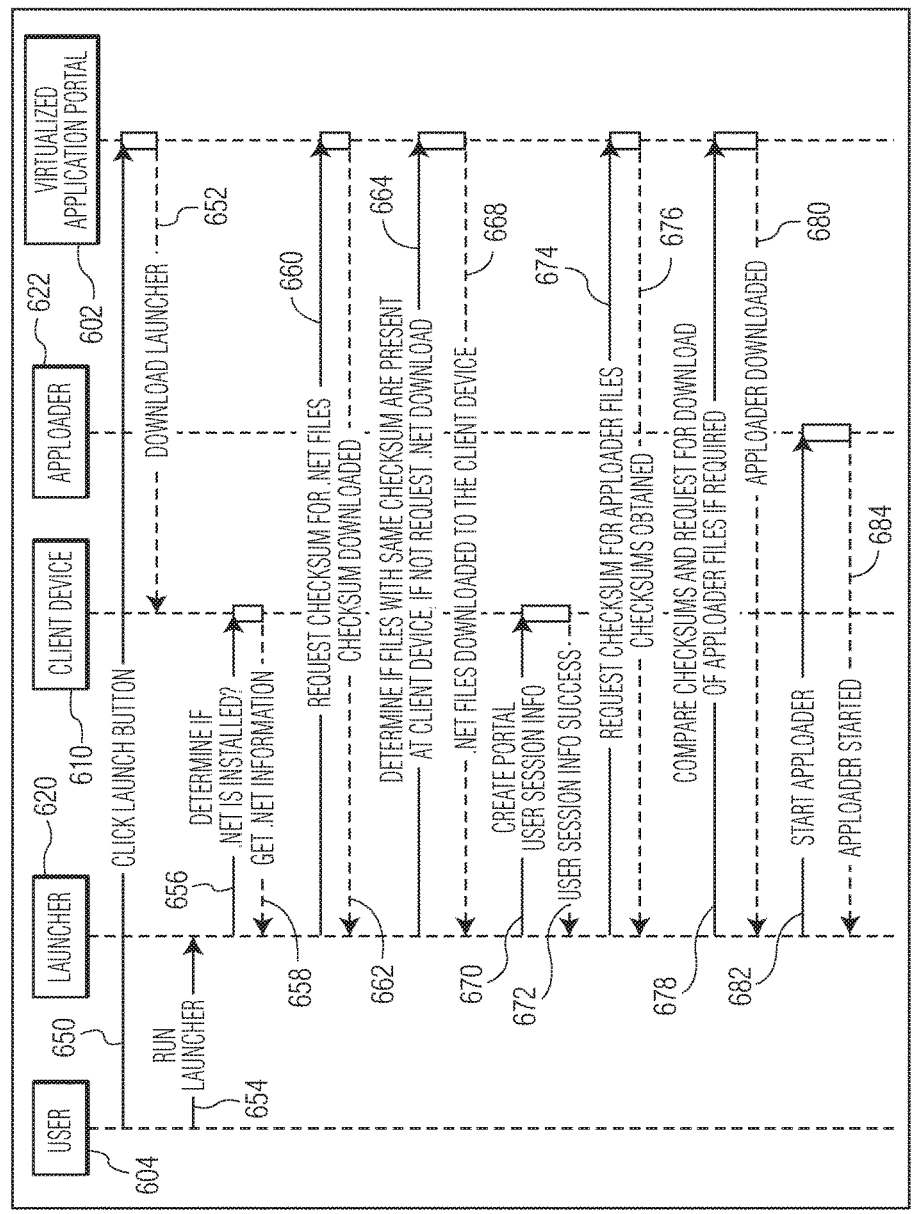

| | CUSTOMERS | REPORTING | INFO | USERS | APPS |
|---|---|---|---|---|---|

⊞ GENERIC DEMO
  DEMO1
⊞ DEMO2
DEMONSTRATION COMPANY
DEMONSTRATION CUSTOMER
HEALTHCARE
SALES DEMO
TEST

MANAGE CUSTOMERS

CREATE NEW CUSTOMER

| CUSTOMER NAME | LOCKDOWN | URL | DATA LOCATION | SERVICE PACK | DEMO PLAYLIST | VLC | DALISTEN ADDRESS |
|---|---|---|---|---|---|---|---|
| ☐ DEMO1 | YES | HTTP://WWW.CITRIX.COM | C:\SAGEDATA | SP7 | | | |
| ☐ DEMO2 | | | | | | | |
| ☐ DEMONSTRATION COMPANY | YES | HTTP://WWW.CLOUDHOUSE.COM/ | | | | | 127.0.0.1 |
| ☐ DEMONSTRATION CUSTOMER | NO | HTTP://WWW.CLOUDHOUSE.COM/ | | | | | 127.0.0.1 |
| ☐ HEALTHCARE | YES | HTTP://WWW.NHS.UK | | | | | |
| ☐ SALES DEMO | | | | | | | |
| ☐ TEST | | | | | | | |

UPDATE SELECTED CUSTOMERS

*FIG. 8A*

| DALISTEN PORT | DASEND ADDRESS | DASEND PORT | INSTANCE CONFIG | VERSION |
|---|---|---|---|---|
| 1400 | CARESYSTEST.CLOUDAPP.NET | 1415 | INSTANCE.CLOUD-HOUSE.CONFIG.CLZ | 8.6.4 |
| 1400 | CARESYSTEST.CLOUDAPP.NET | 1410 | INSTANCE.CLOUD-HOUSE.CONFIG.CLZ | 8.6.4 |

*FIG. 8B*

| CUSTOMERS | REPORTING | INFO | USERS | APPS | APP ASSIGNMENT |

| AVAILABLE APPS | | | |
|---|---|---|---|
| APP | TOTAL LICENSES | AVAILABLE LICENSES | OFFLINE ALLOWANCE (MINUTES) | LICENSES TYPE |
| ACROBAT_READER_11 | | 100 | 1000 | CONCURRENT ASSIGN |
| ADOBEREADERDC | | UNLIMITED | 100 | PER MACHINE ASSIGN |
| CARESYS | | 1 | 99999 | CONCURRENT ASSIGN |
| CBVA | | UNLIMITED | 100 | CONCURRENT ASSIGN |
| CENTRICITY BUSINESS VA DEMO2 | | UNLIMITED | 9999 | CONCURRENT ASSIGN |
| CENTRICITY BUSINESS VIRTUAL ACCESS TEST 2 | | 20 | 99999 | CONCURRENT ASSIGN |
| CLOUDHOUSE AUTO PACKAGER | | UNLIMITED | 9999 | PER MACHINE ASSIGN |
| DEFRAGGLER_2_19 | | UNLIMITED | 1000 | PER MACHINE ASSIGN |
| DEMO BLOOMBERG PROFESSIONAL | | UNLIMITED | 999999 | CONCURRENT ASSIGN |
| DEMO OPEN OFFICE | | UNLIMITED | 999999 | CONCURRENT ASSIGN |
| IE8 DEMO | | UNLIMITED | 999 | CONCURRENT ASSIGN |
| INTERNET EXPLORER 8 VANILLA | | UNLIMITED | 100 | CONCURRENT ASSIGN |

GENERIC DEMO
 DEMO1
DEMO2
DEMONSTRATION COMPANY
DEMONSTRATION CUSTOMER
HEALTHCARE
SALES DEMO
TEST

*FIG. 9A*

| APP | TOTAL LICENSES | AVAIL-ABLE TO ASSIGN | LICE-NSES IN USE | OFFLINE ALLOWANCE (MINUTES) | LICENSES TYPE | |
|---|---|---|---|---|---|---|
| 🔧 NOTEPADPLUSPLUS | ☐ UNLIMITED | | | 100 | PER MACHINE | ASSIGN |
| ⓞ OPENOFFICE41 | | 99 | | 100 | PER MACHINE | ASSIGN |
| 🖼 PHOTOSHOP7 | | 0 | | 1000 | PER MACHINE | ASSIGN |
| sage SAGE 50 PAYROLL 2015 | | 100 | | 9999 | CONCURRENT | ASSIGN |
| 🔺 VLC MEDIA PLAYER | | 1 | | 9999 | CONCURRENT | ASSIGN |
| 🔺 VLC_PLAYER221 | ☐ UNLIMITED | | | 1000 | PER MACHINE | ASSIGN |

ASSIGNED APPS

| APP | TOTAL LICENSES | AVAIL-ABLE TO ASSIGN | LICE-NSES IN USE | OFFLINE ALLOWANCE (MINUTES) | LICENSES TYPE | |
|---|---|---|---|---|---|---|
| 🔧 AUTOCAD ARCHITECTURE 2013 | UNLIMITED | UNLIMITED | 0 | 0 | CONCURRENT | UPDATE / DELETE |
| ⓞ DEMO FOXIT PDF READER | UNLIMITED | UNLIMITED | 0 | 9999 | CONCURRENT | UPDATE / DELETE |
| 🔺 DEMO VLC | UNLIMITED | UNLIMITED | 0 | 999999 | CONCURRENT | UPDATE / DELETE |
| 📄 FOXITPDFREADER | UNLIMITED | UNLIMITED | 0 | 9999 | CONCURRENT | UPDATE / DELETE |

*FIG. 9B*

| | | | | | | | |
|---|---|---|---|---|---|---|---|
| CUSTOMERS | REPORTING | INFO | USERS | APPS | | | |

SELECT REPORT

APP USAGE ▾ SELECT

APP USAGE

START 01/04/2016
END DATA 20/04/2016

🔍 SEARCH  •EXPORT ALL DATA

| APP NAME ⇅ | CUSTOMER NAME ⇅ | USER NAME ⇅ | MACHINE NAME ⇅ | START TIME (UTC) ⇅ | END TIME (UTC) ⇅ | DURA-TION ⇅ | START YEAR ⇅ | |
|---|---|---|---|---|---|---|---|---|
| CARESYS | HEALTHCARE | HCUSER1 | STUARTS-SURFACE | 01/04/2016 10:40:21 | 01/04/2016 10:47:32 | 00:07:11 | 2016 | 86.165.113.107 |
| CARESYS | HEALTHCARE | HCUSER1 | STUARTS-SURFACE | 05/04/2016 15:49:47 | 05/04/2016 15:50:43 | 00:00:56 | 2016 | 89.197.22.30 |
| CARESYS | HEALTHCARE | HCUSER1 | SG-XPS | 07/04/2016 12:52:49 | 07/04/2016 12:54:20 | 00:01:31 | 2016 | 31.221.108.26 |
| CARESYS | HEALTHCARE | HCUSER1 | SG-XPS | 07/04/2016 12:54:55 | 07/04/2016 12:55:05 | 00:00:10 | 2016 | 31.221.108.26 |
| CARESYS | HEALTHCARE | HCUSER1 | SG-XPS | 07/04/2016 12:54:42 | 07/04/2016 12:55:07 | 00:00:25 | 2016 | 31.221.108.26 |
| CARESYS | HEALTHCARE | HCUSER1 | SG-XPS | 07/04/2016 12:55:22 | 07/04/2016 12:56:36 | 00:01:14 | 2016 | 31.221.108.26 |
| CARESYS | HEALTHCARE | HCUSER1 | SG-XPS | 07/04/2016 12:57:23 | 07/04/2016 12:59:15 | 00:01:52 | 2016 | 31.221.108.26 |
| CARESYS | HEALTHCARE | HCUSER1 | SG-XPS | 11/04/2016 15:28:39 | 11/04/2016 15:32:09 | 00:03:30 | 2016 | 31.221.108.26 |
| CARESYS | HEALTHCARE | HCUSER1 | SG-XPS | 11/04/2016 15:32:25 | 11/04/2016 16:03:02 | 00:30:37 | 2016 | 31.221.108.26 |
| CARESYS | HEALTHCARE | HCUSER1 | SG-XPS | 12/04/2016 08:49:27 | 12/04/2016 08:50:02 | 00:00:35 | 2016 | 31.221.108.26 |

⊞GENERIC DEMO
  DEMO1
⊞ DEMO2
DEMONSTRATION COMPANY
DEMONSTRATION CUSTOMER
HEALTHCARE
SALES DEMO
TEST

METHOD AND SYSTEM FOR DEPLOYING VIRTUALIZED APPLICATIONS

CROSS-REFERENCE TO RELATED APPLICATION

This application is entitled to the benefit of provisional U.S. Provisional Patent Application Ser. No. 62/325,933, filed Apr. 21, 2016, which is incorporated by reference herein.

FIELD OF THE INVENTION

The invention relates generally to application virtualization, and, more specifically to methods and systems for deploying virtualized applications.

BACKGROUND

In traditional enterprise environments, desktop software applications, such as productivity tools and database management tools, have been installed on local machines and run natively on the local machines. In client-server environments, software clients can run client-server based applications in which a database is stored on a server. More recently, traditional desktop applications have been "virtualized" such that "virtualized applications" can be run via a client at a local machine with less dependency on the specific configuration (e.g., operating system version) of the local machine. Application virtualization is a technique in which an application is decoupled from the underlying operating system of the local machine on which the application executes. Various techniques for application virtualization are known in the field. Although application virtualization enables applications to run on local machines with different configurations, deployment of virtualized applications, especially in large enterprise environments, can be cumbersome and resource intensive.

SUMMARY

A method for deploying virtualized applications is disclosed. The method involves, at a client device, downloading a launcher from a virtualized application portal to the client device, running the launcher at the client device, wherein running the launcher comprises checking for a first dependency and downloading a file of the first dependency if the first dependency is not installed on the client device, after checking for the first dependency, downloading an apploader from the virtualized application portal, and running the apploader at the client device. Running the apploader involves determining a configuration of the client device and downloading virtualized application components dependent on the configuration, determining specific needs of the virtualized application and downloading components dependent on the specific needs, and starting the virtualized application on the client device.

In an embodiment, the launcher is written in C.

In an embodiment, the launcher is an executable file.

In an embodiment, checking for a first dependency comprises checking to see if the .NET framework is installed on the client device.

In an embodiment, determining a configuration of the client device involves determining whether the client device is a 32-bit machine or a 64-bit machine and downloading a virtualized application component based whether the client machine is a 32-bit machine or a 64-bit machine.

In an embodiment, the virtualized application components are application binaries.

In an embodiment, the specific needs of the virtualized application are runtime requirements.

In an embodiment, the method further involves, at the client device, navigating to the virtualized application portal using a browser and initiating a launch button from within the browser to trigger downloading of the launcher.

In an embodiment, the method further involves, at the client device, running a push agent or an executable file that triggers downloading of the launcher.

In an embodiment, running the apploader at the client device comprises applying a workflow using client environment information.

In an embodiment, running the apploader at the client device comprises applying a workflow using custom fields.

An embodiment of a method for deploying virtualized applications is disclosed. The method involves, at a client device, downloading a launcher from a virtualized application portal to the client device, wherein the launcher is written in C and wherein the launcher file is an executable file, running the launcher at the client device, wherein running the launcher comprises checking to see if the .NET framework is installed at the client device and downloading and installing a version of the .NET framework if the .NET framework in not already installed at the client device, after the .NET framework is installed on the client device, downloading an apploader from the virtualized application portal, wherein the apploader is dependent on the .NET framework to run, and running the apploader at the client device. Running the apploader involves determining a configuration of the client device and downloading virtualized application binaries dependent on the configuration, determining a runtime requirement of the virtualized application and downloading components dependent on the runtime requirement, and after the runtime requirement is downloaded, executing at least one of the application binaries to start the virtualized application.

In an embodiment, the method involves determining a configuration of the client device involves determining whether the client device is a 32-bit machine or a 64-bit machine and downloading a virtualized application component based whether the client machine is a 32-bit machine or a 64-bit machine.

In an embodiment, the method involves, at the client device, navigating to the virtualized application portal using a browser and initiating a launch button from within the browser to trigger downloading of the launcher.

In an embodiment, the method involves, at the client device, running a push agent or an executable file that triggers downloading of the launcher.

In an embodiment, running the apploader at the client device comprises applying a workflow using client environment information.

In an embodiment, running the apploader at the client device comprises applying a workflow using custom fields.

A system for deploying virtualized applications is discloses. The system includes a virtualized application portal having a plurality of virtualized applications, a launcher, and an apploader. The launcher is configured to check to see if the .NET framework is installed at a client device and to download and install a version of the .NET framework at a client device if the .NET framework in not already installed at the client device and, after the .NET framework is installed on the client device, to download the apploader, wherein the apploader is dependent on the .NET framework to run, and to run the apploader. The apploader is configured to determine a configuration of the client device and to download virtualized application binaries dependent on the configuration, to determine a runtime requirement of the virtualized application and to download components dependent on the runtime requirement, and after the runtime requirement is downloaded, to execute at least one of the application binaries to start the virtualized application.

In an embodiment of the system, determining a configuration of the client device involves determining whether the client device is a 32-bit machine or a 64-bit machine.

In an embodiment of the system, the launcher is written in C and wherein the launcher is an executable file.

In an embodiment of the system, the virtualized application portal is configured to manage licenses of virtualized applications that are used by client devices.

In an embodiment of the system the virtualized application portal is configured to provide reports on the usage of virtualized applications by client devices.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6 is a timeline diagram of an example of the launcher process illustrated in FIG. 5.

FIGS. 8A and 8B depict an embodiment of a graphical user interface within a browser that can be used to manage customers.

FIGS. 9A and 9B depict an embodiment of a graphical user interface within a browser that is used to manage virtualized applications and licenses of virtualized applications at the virtualized application portal.

FIG. 10 is an example embodiment of a graphical user interface within a browser that is used to report application usage.

Throughout the description, similar reference numbers may be used to identify similar elements. Additionally, in some cases, reference numbers are not repeated in each figure in order to preserve the clarity and avoid cluttering of the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or to characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
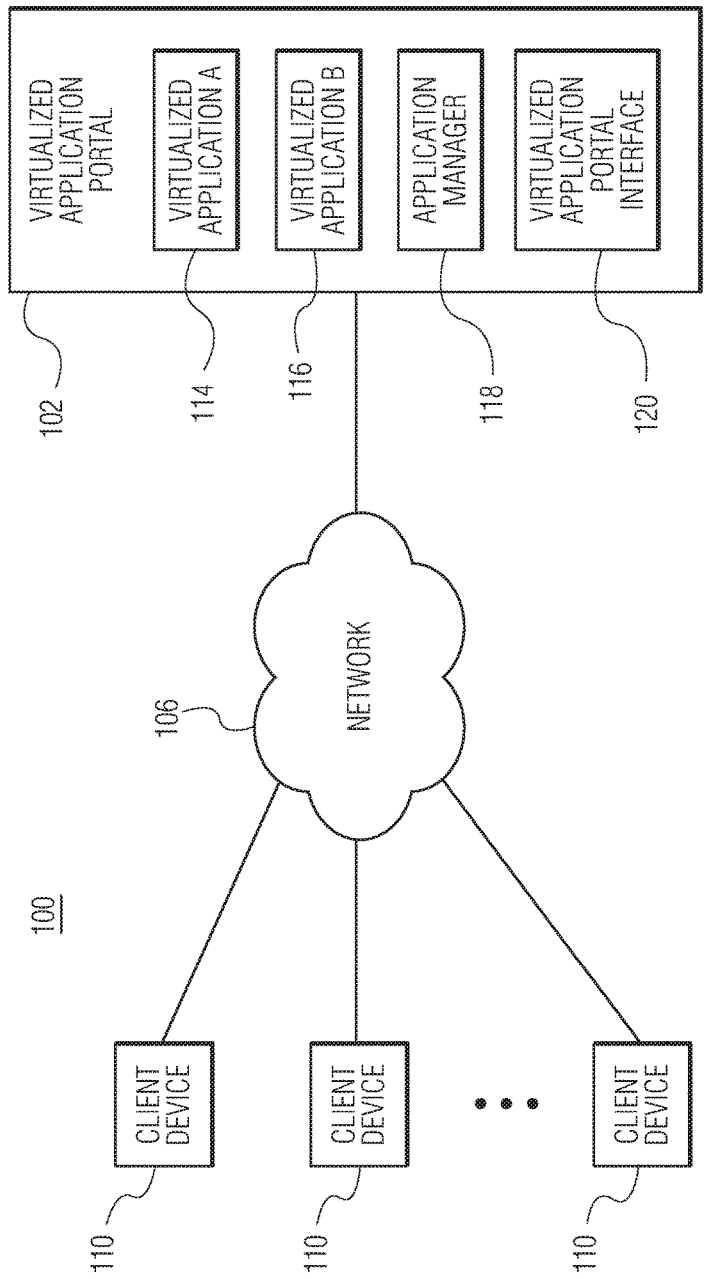
FIG. 1 is a diagram of an example of a system for deploying virtualized applications.

FIG. 1 is a diagram of an example of a system 100 for deploying virtualized applications. The example system includes a virtualized application portal (VAP) 102, a network 106, and at least one client device 110. In an embodiment, the virtualized application portal includes one or more servers that support at least one virtualized application 114 (e.g., virtualized application A and virtualized application B), a portal manager 118, and at least one virtualized application portal interface 120. In an embodiment, the virtualized applications may include applications such as productivity tools and database management tools. In an embodiment, the portal manager may include various components such as a customer administrator component, an application usage component, a user management component, an application management component, and a package manager. In an embodiment, the virtualized application portal interface may include various components that enable communications with application users, customer administrators, portal administrators, and application packagers.

In an embodiment, the virtualized application portal 102 is implemented on one or more computing devices, such as a server that includes at least one processor and memory as is known in the field. In an embodiment, the server includes at least one processor and memory and executes computer readable instructions. In an embodiment, the server includes a processor, memory, at least one user interface, and a communications interface. The processor may include a multifunction processor and/or an application-specific processor. The memory within the computer may include, for example, a storage medium such as read only memory (ROM), flash memory, random access memory (RAM), and large capacity permanent storage devices such as hard disk drives. The user interface may include, for example, a keyboard, a mouse, a display, and/or a touch display. The communications interface enables communications with other computers via, for example, a local area network (LAN) protocol such as Ethernet and/or the Internet Protocol (IP). The computer readable instructions stored in the storage medium are configured to implement various tasks as described herein. In an embodiment, the server runs an operating system, such as the WINDOWS SERVER operating system from MICROSOFT. Although a server running the WINDOWS SERVER operating system is described, servers that run other operating systems are possible.

In an embodiment, the network 106 utilizes wired and/or wireless communications techniques as are known in the field. The network may include a LAN that utilizes LAN technologies, a wide area network (WAN) that utilizes WAN technologies, or a combination of a LAN and a WAN. In one embodiment, at least one portion of the network includes the Internet.

In an embodiment, the client devices 110 are computing systems, such as desktop computers, laptop computers, tablets, and/or smartphones, which include at least one processor and memory and execute computer readable instructions. In an embodiment, the computing devices include a processor, memory, at least one user interface, and a communications interface. The processor may include a multifunction processor and/or an application-specific processor. Examples of processors include the POWERPC family of processors by IBM and the x86 family of processors by INTEL. The memory within the computing system may include, for example, a storage medium such as ROM, flash memory, RAM, and a large capacity permanent storage device such as a hard disk drive. The user interface may include, for example, a keyboard, a mouse, a display, and/or a touch display. The communications interface enables communications with other computers via, for example, a wireless protocol, a LAN protocol such as Ethernet, and/or IP. The computing system executes computer readable instructions stored in the storage medium to implement various tasks as described herein. In an embodiment, the client device runs an operating system, such as the WINDOWS operating system from MICROSOFT. Although a client device running the WINDOWS operating system is described, client devices that run other operating systems are possible. In an embodiment, the computing system is a standalone machine that includes a processor and memory that run only one instance of an operating system and that are specific to the machine and not shared by other physically separated computer systems.

The system 100 described with reference to FIG. 1 is configured to enable deployment of virtualized applications from the virtualized application portal 102 to the client devices 110 for execution at the client devices, e.g., execution by a processor and memory that are unique to the client device and/or that are exclusive components of a standalone device such as a desktop computer, a laptop computer, a tablet, and/or a smartphone. In general, a "virtualized application" or "application virtualization" involves techniques that decouple applications from the underlying operating system of the client device. In an embodiment, decoupling applications from the underlying operating system of the client device involves separating, dividing, insulating, and/or protecting the operating system from the virtualized application. For example, an application is virtualized so that when the application is installed on a client device, the application does not write or dilute the operating system files or registries and/or does not corrupt the operating system itself. In an embodiment, an application virtualization layer creates a "sandbox," which is an insulated environment on the client device. For example, a "sandbox" may include controls that limit access by the application to files, registries, certain hardware, and/or certain other applications. Application virtualization can utilize user space/user mode virtualization techniques and/or kernel space/kernel mode virtualization techniques. In an embodiment, user space/user mode virtualization can be implemented without needing administrative rights to access certain resources, such as certain files/registries. In an embodiment, a virtualized application is not installed on the client device in a conventional manner in that in a convention installation the application declares, while installing on the operating system, that the application is installing and hence the operating system is aware that something was installed. Additionally, in a conventional installation, the application writes specific files/registries in the installation areas of the registry to make the operating system aware of the application. On the other hand, in an embodiment, a virtualized application does not declare to the operating system that the application is installing. Therefore, the operating system does not necessarily know that an application was installed at least because the application writes all the files and registries used by the application to run in a virtualized file system and a virtualized registry area. An application that is installed in a conventional matter is often referred to a "native" application whereas an application installed using a virtualized file system and a virtualized registry area is referred to as a "virtualized application." In an embodiment, execution of a virtualized application at runtime is controlled by the application virtualization layer. In an embodiment, a virtualized application appears to a user to interface directly with the client device's operating system, but the virtualized application is interfacing with the application virtualization layer. In an embodiment, the application virtualization layer intercepts communications between the application and the operating system and acts a proxy between the application and the native system registries and system files of the operating system running on the client device. In an embodiment, the application virtualization layer can implement virtual registry files and secure file stores within the "sandbox." An application virtualization layer may be implemented through set of components (e.g., files) that implement the application virtualization layer. Virtualized applications may be organized and stored as a "package," which includes a set or bundle of files that are used to run the virtualized application. In an embodiment, application packages can be stored on the virtualized application portal for access by the client devices. In an embodiment, applications that utilize different application virtualization techniques can be packaged and stored as application packages on the virtualized application portal. In an embodiment, applications that utilize application virtualization techniques from different virtualization vendors can be hosted on the same virtualized application portal. Such application packages can then be accessed and downloaded by client devices for execution at the respective client devices.

Figure 2:
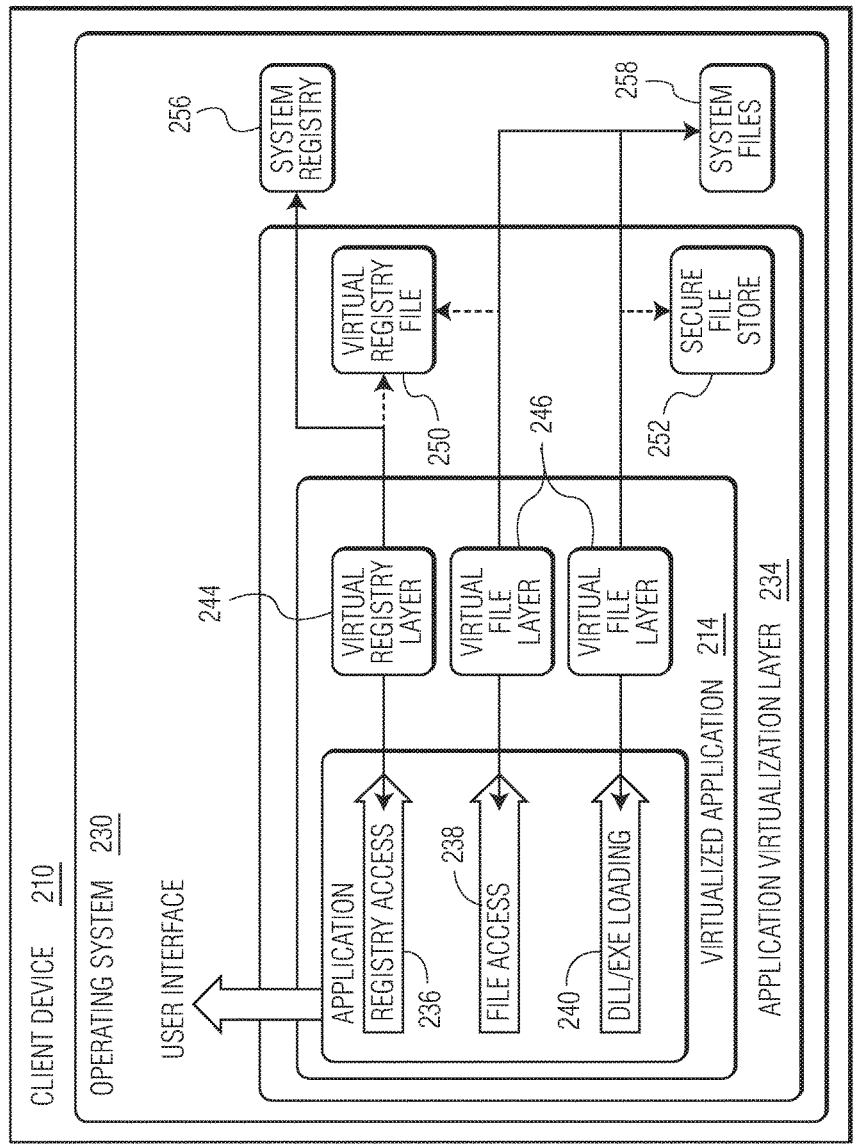
FIG. 2 is a graphical illustration of a virtualized application that executes at a client device.

FIG. 2 is a graphical illustration of a virtualized application 214 that executes at a client device 210. As described above, the client device includes hardware resources such as at least one processor and memory (not shown), to execute an operating system 230, such as the WINDOWS operating system. The operating system and the application are executed by the hardware resources of the client device but the virtualized application is decoupled from the operating system by an application virtualization layer 234 that creates a "sandbox." In operation, registry access 236, file access 238, and dynamic link library (DLL)/executable (EXE) loading 240 operations of the application are intercepted by virtual registry layer 244 and virtual file layer 246 elements of the application virtualization layer before interacting with a virtual registry file 250 and/or a secure file store 252 within the application virtualization layer. The virtualized application may also interact with a system registry 256 and system files 258 of the client device's operating system via the application virtualization layer as illustrated in FIG. 2. Although FIG. 2 illustrates an example of application virtualization, it should be understood that other embodiments of application virtualization are possible.

Referring back to FIG. 1, virtualized applications 114 (e.g., in the form of a virtualized application package) are stored at the virtualized application portal 102 and can be provided to the client devices 110 for use at the client devices. In accordance with an embodiment of the invention, virtualized applications are deployed from the virtualized application portal to the client devices in a manner that is quick and easy for a user of the client device. For example, the user can navigate using a browser to the virtualized application portal and can launch a virtualized application with a click on a corresponding application launch button. A technique for deploying virtualized applications in such a manner is described below with reference to FIGS. 3-10.

Figure 3:
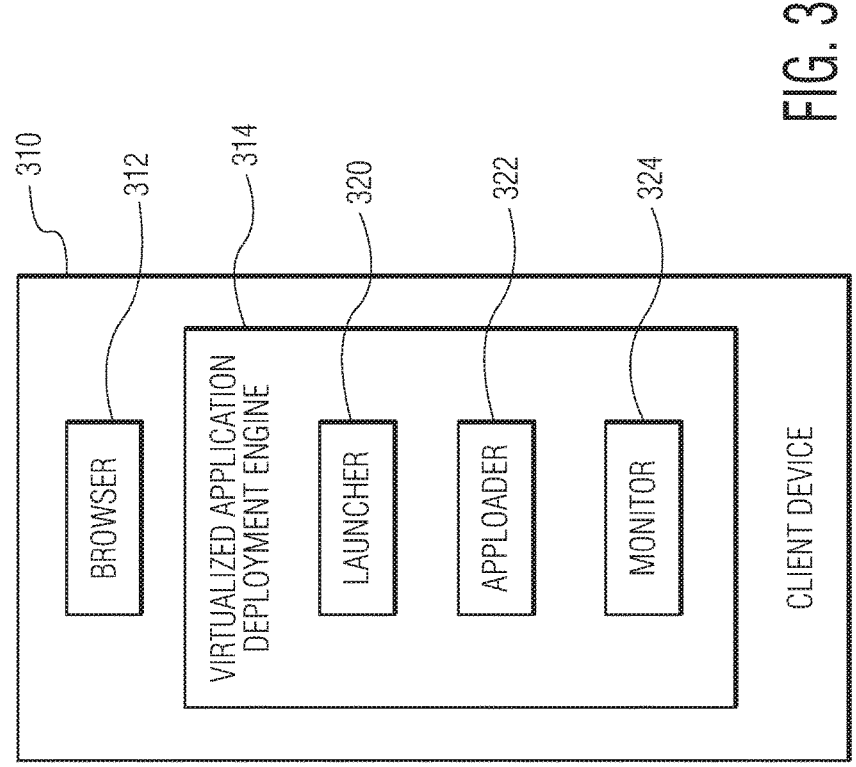
FIG. 3 illustrates elements of a client device, such as the client devices as shown in FIG. 1, which are used in the process of deploying a virtualized application from a virtualized application portal to the client device.

FIG. 3 illustrates elements of a client device 310, such as the client devices 110 as shown in FIG. 1, which are used in the process of deploying a virtualized application from the virtualized application portal to the client device. The elements include a browser 312, such as a standard web browser, and a virtualized application deployment engine 314 that includes a launcher 320, an apploader 322, and a monitor 324. The launcher is configured to support an initial launch operation (referred to as a "launcher" process), the apploader is configured to support a dynamic configuration operation (referred to as an "apploader" process), and the monitor is configured to support a monitoring operation. Although the launcher, the apploader, and the monitor are depicted as elements of the client device, as is described in more detail below, the launcher, apploader, and/or monitor may be remotely hosted (e.g., at the virtualized application portal) and downloaded from the remote host (e.g., the virtualized application portal) on an as needed basis. Operations related to deploying a virtualized application are described in more detail below.

Figure 4:
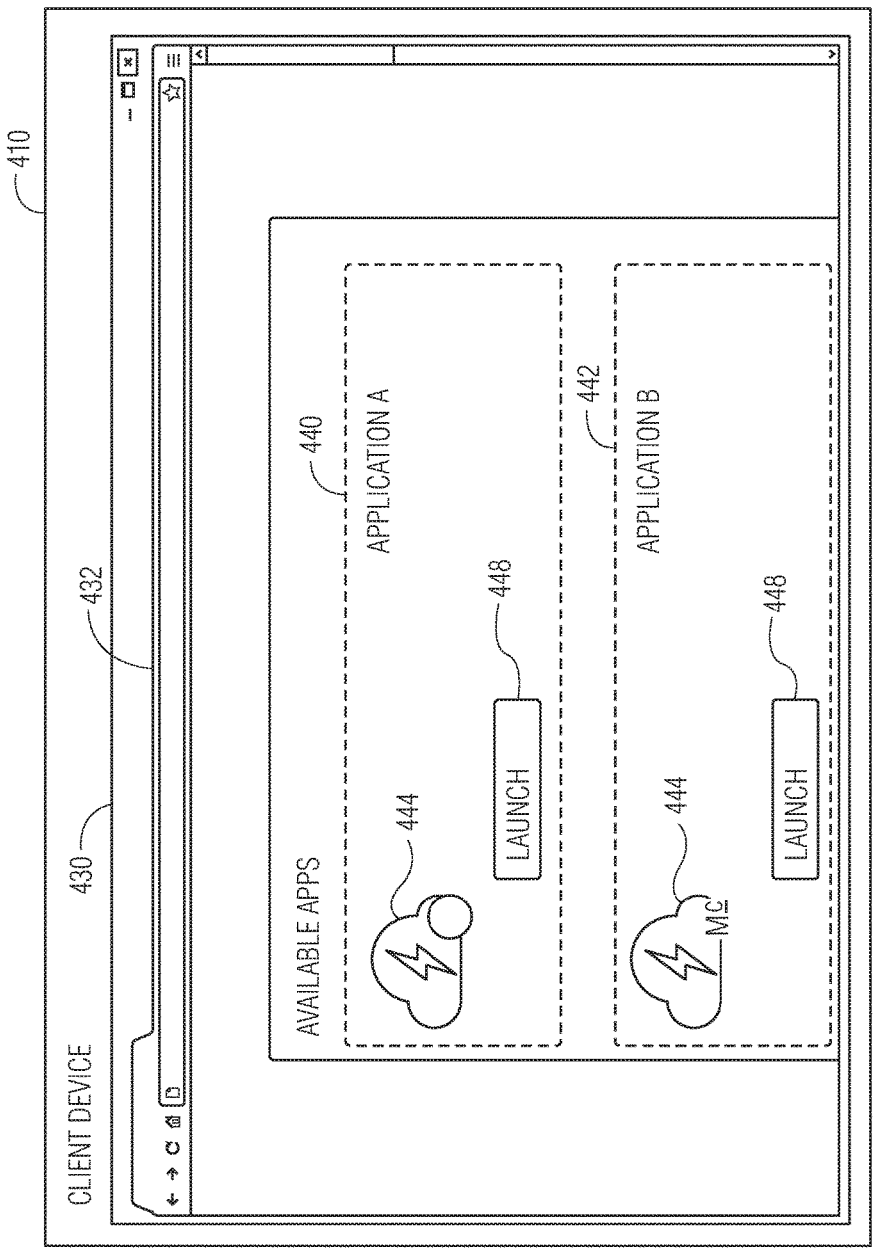
FIG. 4 depicts the client device with a display on which a graphical user interface of a browser is displayed.

In an embodiment, virtualized applications are hosted at the virtualized application portal and a user of the client device can navigate to the virtualized application portal using a browser. FIG. 4 depicts a client device 410 with a display 430 on which a graphical user interface of a browser 432 is displayed. In the example of FIG. 4, the browser has been navigated to a virtualized application portal that hosts two virtualized applications, virtualized application A 440 and virtualized application B 442. In the embodiment of FIG. 4, each virtualized application is represented by an application icon 444, an application name (e.g., "Application A" and "Application B"), and a launch button 448, however, the virtualized applications can be represented in different ways on the graphical user interface. With the virtualized applications displayed as shown in FIG. 4, a user can launch one of the virtualized applications by simply clicking on the corresponding launch button (e.g., with a mouse and mouse pointer or with a touch interaction). Although a launch button is shown, other techniques may be used to initiate the launch operation. In an embodiment, activation of the launch button triggers a deployment operation that is described below with reference to FIGS. 5A, 5B, and 6.

Figure 5A:
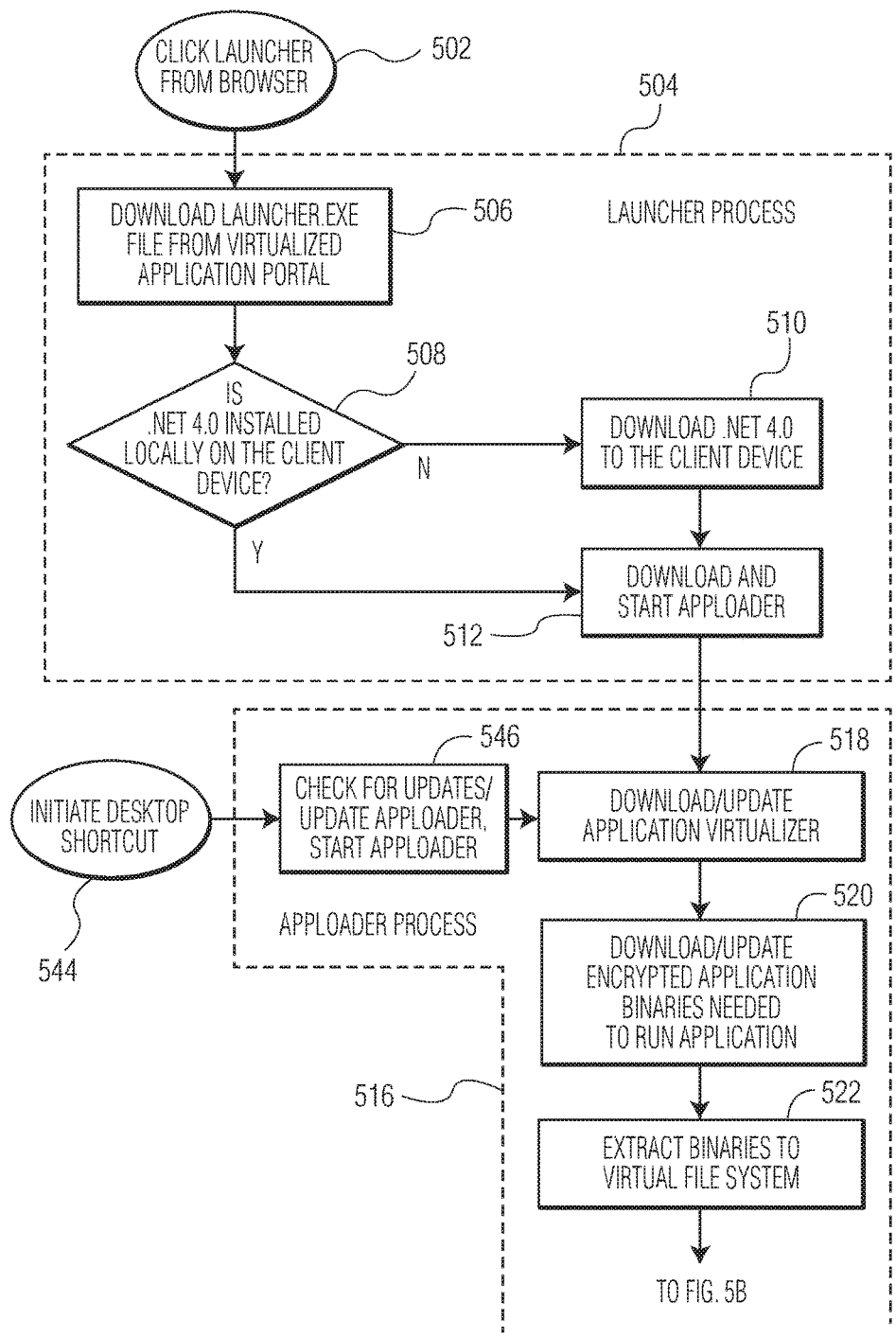
FIGS. 5A and 5B depict a process flow diagram of a technique for deploying a virtualized application.

With reference to FIG. 5A, at user interaction 502, a user initiates a launch operation by, for example, clicking on the launch button of a graphical user interface of a virtualized application portal displayed within a browser as shown in FIG. 4. An example of the launcher process is identified by dashed box 504. In response to clicking the launch button that is within the browser, at block 506 an executable file, referred to as "launcher.exe," is downloaded from the virtualized application portal and run by the client device. In an embodiment, a first "click" on the launcher button that is within the browser is performed to trigger downloading of the launcher.exe file and a second "click" on a "run" button, which appears outside the browser once the launcher.exe file is downloaded, is performed to run the launcher.exe file. In an embodiment, the client device may be configured to automatically run downloaded executable files such as the launcher.exe file such that the second click to run the launcher.exe file is not needed. In an embodiment, the launcher.exe file is a small executable file (e.g., a binary file or files) that is written in the C computing language so that the binaries can most likely be executed on the client device. For example, the launcher.exe file runs on the client device with few dependencies, e.g., the launcher.exe file is not dependent on the .NET framework or on special Application Programming Interfaces (APIs), with the primary dependency being the ability to execute binaries created using a C compiler. Since such binaries have no external dependencies on any framework or special APIs, the binaries of the launcher.exe file will run on most client devices.

In an embodiment, the launcher.exe file acts as a bootstrap executable file (e.g., ".exe"), which, when executed, orchestrates the setup of certain basic dependencies that are needed to run a virtualized application. For example, the launcher process implemented by the execution of the launcher.exe file gets the client device ready to implement the apploader process (e.g., to execute an apploader.exe file), which is a more complex operation at least because the apploader has dependencies such as, for example, the .NET framework. Thus, the launcher.exe file acts as a first entry point executable file and is configured to run with very few dependencies, e.g., the primary dependency being the ability to execute binaries created using a C compiler, which is common on most client machines running WINDOWS or MAC OS X. Therefore, the launcher.exe file will run successfully on a large number of client devices that are currently deployed. Once the launcher.exe file is started, the launcher process implements preparatory steps such as contacting the virtualized application portal and detecting certain configuration parameters of the client device.

In an embodiment, the launcher.exe file includes strings and/or space reserved for strings. A string, such as a session ID or a secure token, may be used to enable exchange of information between the browser and the launcher where the browser does not natively allow such exchange. In an embodiment, the string may allow the virtualized application portal to know what virtualized application was started and the context in which the virtualized application was started. For example, when a virtualized application is started, the user may be known so that a user ID and password are not needed to start the virtualized application. In an embodiment, a string of a secure token represents session information for the user, logged in to the virtualized application portal, which is requesting to download the launcher.exe file. The unique session ID is generated for that particular instance for that user, and the unique session ID is added as a string to the launcher.exe file on the virtualized application portal just before the launcher.exe file is offered for download to the user. The unique session ID is used by the launcher to write the session globally unique identifier (GUID) into the registry on the client device, and is used later by the apploader for further passing the GUID to the monitor, which uses the GUID to find the context of the user and the application in which the GUID has been invoked, and validates the licensing from the virtualized application portal using the session GUID.

Referring again to FIG. 5A, at decision point 508, a determination is made as to whether or not the .NET framework is locally installed at the client device. As is known in the field, the .NET framework, referred to herein as simply ".NET," is a software framework developed by MICROSOFT that runs primarily on MICROSOFT WINDOWS. .NET includes a large class library known as the Framework Class Library (FCL) and provides language interoperability, e.g., each language can use code written in other languages, across several programming languages. Programs written for .NET execute in a software environment, as opposed to a hardware environment, known as the Common Language Runtime (CLR). CLR is an application virtual machine that provides services such as security, memory management, and exception handling. FCL and CLR together constitute .NET. FCL provides user interface, data access, database connectivity, cryptography, web application development, numeric algorithms, and network communications. .NET is used by many applications created for the WINDOWS platform, thus .NET is often needed to run a virtualized application. Although in this case the determination is made with regard to .NET 4.0, the determination could be made for a different interoperability software component. If it is determined that .NET 4.0 is not locally installed on the client device, then at block 510, .NET 4.0 is downloaded to the client device from the virtualized application portal. In an embodiment, .NET is downloaded from the virtualized application portal as a .NET 4.0 package that includes files needed to run a virtualized version of .NET 4.0 on the client device. Although .NET 4.0 is described in this use case, other versions of .NET may be used. Once .NET 4.0 is downloaded and run on the client device, the process proceeds to block 512. At decision point 508, if .NET 4.0 is determined to be locally installed on the client device, then the process proceeds directly to block 512.

At block 512, an element referred to as "apploader" is downloaded to the client device from the virtualized application portal and started at the client device. For example, downloading the apploader is initiated by the launcher such that the process is transparent and/or automatic from the perspective of the user. In an embodiment, apploader is a bundle or package of computer executable files that coordinate the installation of the virtualized application. In general, the apploader dynamically configures a virtualized application on the client device depending on the configuration of the client device. For example, configuration parameters of the client device that may affect installation of the virtualized application are identified "on the fly" (e.g., at the time the application is launched) and include whether the client device is a 32-bit machine or a 64-bit machine and/or whether the client device has any specified language dependencies (e.g., a language other than the standard language). A further description of the process implemented by the apploader is provided below.

Because the .NET framework is required by many applications to run, ensuring that the client device has a working version of the .NET framework is an important task of the launcher process. Further, in an embodiment, the apploader process (e.g., as implemented through the apploader.exe file) is dependent on the .NET framework and so the client machine needs the .NET framework up and running to proceed to the apploader process. The launcher process can also ensure that other pre-requisites, such as placing the GUID in a registry used by the apploader.exe file, needed to run the apploader.exe file are satisfied. The launcher.exe file is configured to start the apploader.exe file once all of the dependencies have been addressed and then, once the apploader.exe file is up and running, execution of the launcher.exe file self terminates. Using the launcher process to ensure that the .NET framework is available on the client device removes the risk of trying to start a virtualized application in an environment where the virtualized application cannot run because the .NET framework is not available. Additionally, using the launcher process to check for, and separately download the .NET framework, avoids the need to include the files for the .NET framework in every package of a virtualized application. In an embodiment, the launcher.exe is a small, light, and generically written bootstrap .exe file. For example, the file may be on the order of 600*800 kB. Additionally, in an embodiment, the launcher.exe file is written in C with very few, if any, dependencies on runtime components so that the file will execute on any WINDOWS operating system. For example, in an embodiment, the launcher.exe file uses only simple C functions, and relies on a limited number of WINDOWS APIs so that the file will run on any version of WINDOWS with no specific dependencies on any runtime components or on many other operating system DLL files. As can be seen from the launcher process, a small relatively simple .exe file (e.g., in the C programming language) is used to initially start the process of launching a virtualized application. Because the .exe file is written in a programming language with few dependencies, e.g., in the C programming language, the launcher process can be easily implemented across a wide variety of operating systems.

Figure 5B:
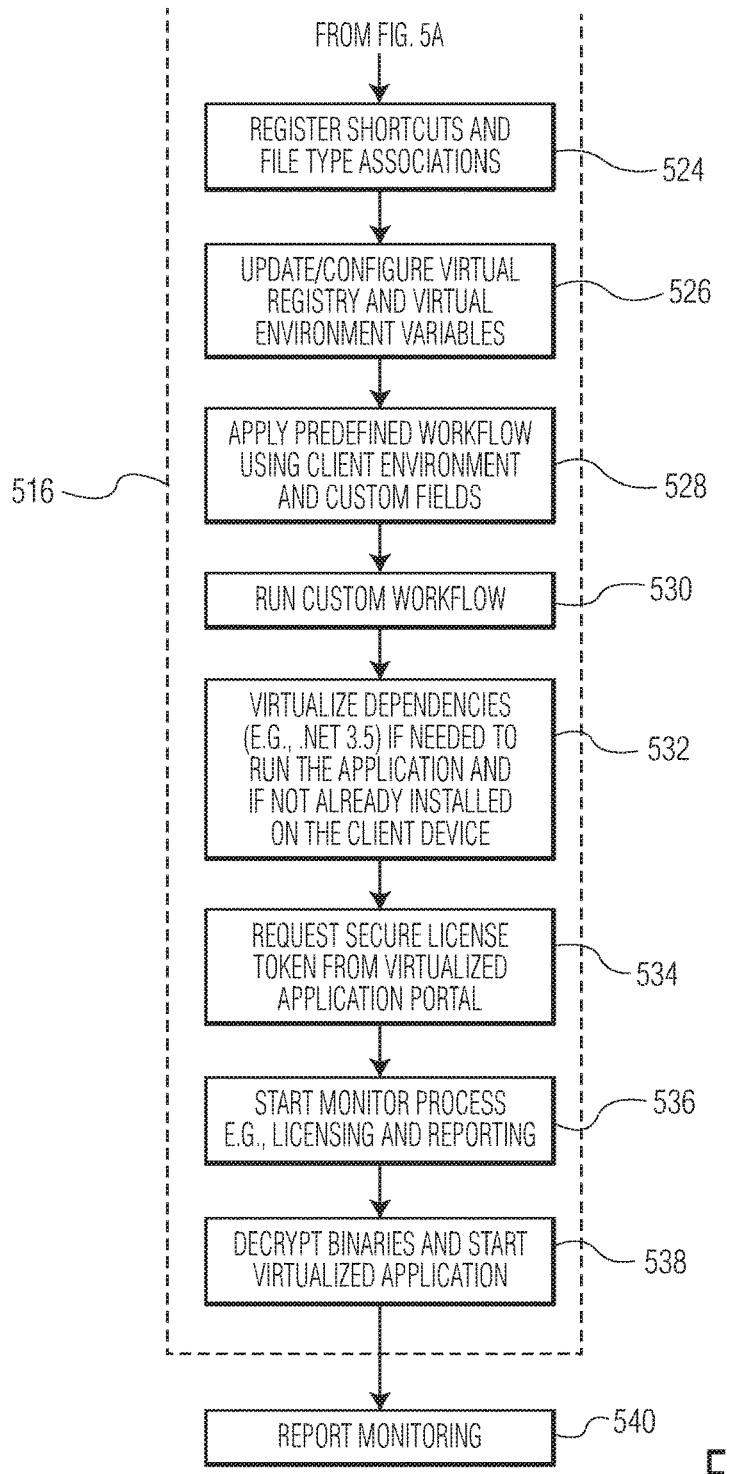

Details of the operation supported by the launcher are described below with reference to FIG. 6, which is a timeline diagram of an example of the launcher process illustrated in FIGS. 5A and 5B. The timeline diagram corresponds to operations between a user 604, the launcher 620, the client device 610, the apploader 622, and the virtualized application portal 602. In a first operation 650, the user clicks the launch button of a virtualized application that is hosted by the virtualized application portal. As shown in FIG. 4, the launch button is within the graphical user interface of the browser that is running on the client device. In response to the user activation of the launch button, at operation 652, a launcher (e.g., the launcher.exe file) is downloaded from the virtualized application portal to the client device. Once the launcher.exe file is downloaded to the client device, the user runs the launcher.exe file by, for example, clicking on a "run" button of a graphical user interface on the client device, see operation 654.

Once the launcher.exe file begins to execute, at operation 656, a determination is made as to whether or not .NET (e.g., .NET 4.0) is installed on the client device. For example, it is determined whether or not .NET is natively installed on the client device. If .NET is not installed on the client device, then, in an embodiment, the applauncher infers that .NET will have to be run in a virtualized mode. If .NET is installed on the client device, then at operation 658, the launcher gets information about the .NET element, e.g., the version number, .NET element (which contains settings that specify how the .NET framework connects to the network), and the platform of the operating system (e.g., 32-bit or 64-bit). At operation 660, the applauncher requests checksums for the .NET files from the virtualized application portal and at operation 662, the checksums are downloaded from the virtualized application portal to the launcher (via the client device). At operation 664, a determination is made as to whether files with the same checksum are present at the client device and if not, files with mismatched checksums are requested from the virtualized application portal. The checksum comparison process enables the client device to download only those files that the client device does not already have or the files that have been changed (e.g., updated, since they were last downloaded). For example, only those files with mismatching checksums or missing or new files are downloaded from the virtualized application portal to the client. In an embodiment, the virtualized application portal runs a checksum service that maintains checksums for files that are stored at the virtualized application portal. At operation 668, the desired .NET files are downloaded to the client device. If an updated version of .NET is already natively installed on the client device, then no .NET files may need to be obtained by the client device at this point. At operation 670, portal user session information is created at the client device by the launcher and at operation 672, the client device indicates to the launcher that the user session information was successfully created. In an embodiment, the portal user session information includes a GUID from the launcher.exe file that is used to track application license usage. In an embodiment, the launcher creates registry entries at the client device depending on the session ID associated with the user of the virtualized application portal. At operation 674, the launcher requests checksums for files of the apploader and at operation 676, the checksums are provided from the virtualized application portal to the launcher (via the client device). In an embodiment, the apploader is a package of files that includes, for example:

1. The apploader.exe file and its dependencies;
2. An apploader.clc file, which is the config file for the "apploader.exe," which defines a series of actions to be taken;
3. An updateapploader.clc file, which defines the actions required to be taken if it is detected that the apploader-.exe file or any part of the software package is updated;
4. A config file that is specific to the application, e.g., IE.clc for Internet Explorer, which contains the logic that is used to download and pre-configure an application, such as Internet Explorer; and
5. An appmonitor.exe, which is the application monitor (in an embodiment, this file has no config).

At operation 678, the launcher compares the downloaded checksums to previously stored checksums to determine if files of the apploader need to be downloaded from the virtualized application portal to the client device. Based on the checksum comparisons at operation 680, desired files of the apploader are downloaded from the virtualized application portal to the client device. Once the apploader files have been checked and the desired files have been downloaded to the client device at operation 682, the launcher starts execution of the apploader. For example, the launcher starts execution of a .exe file (e.g., the apploader.exe file) of the apploader without any interaction and/or command from the user of the client device. Since .NET has been downloaded to the client device, the client device is configured to be able to execute components of the apploader that depend on the .NET framework. Once the apploader process is started, at operation 684, the apploader confirms that the apploader has started and the launcher process is ended. Thus, the client device transitions from the launcher process to the apploader process seamlessly, or automatically, without needing an action from the user of the client device. From the user's perspective, an application is launched from a browser with a simple click and run process that involves, for example, clicking on a launch button that appears within the browser and then clicking on a "run" button that appears outside the browser.

Although in the embodiment described with reference to FIGS. 5A, 5B, and 6, a user initiates the launch process by clicking on a launch button, other techniques may be used to initiate the launch operation. For example, in an embodiment, a push agent, or small executable file, can be distributed from the virtualized application portal to the client devices and the push agent or small executable file to automatically trigger (e.g., using a web service) the launch operation at the client devices. In an embodiment, a push agent is not strictly invoked for a task, but activates itself, a push agent may reside in wait status on the client device, a push agent may perceive context at the client device, a push agent may get to run status on the client device upon starting conditions or upon some other event, a push agent may not require interaction of the user of the client device, and a push agent may invoke other tasks including communication to, for example, the virtualized application portal. For example, characteristics of a push agent may include reaction to the environment, autonomy, goal-orientation, and persistence. In an embodiment, a push agent is used to deploy virtualized applications from the virtualized application portal automatically without interaction from a user, e.g., without the user having to navigate to the virtualized application portal and click on the launch button of an application.

Referring back to FIG. 5, the launcher process 504 is typically implemented the first time a virtual application is used at a particular client device but does not need to be repeated for subsequent uses of the virtualized application at the client device. Once the launcher process is implemented (e.g., either initiated by the user or automatically through a push agent), the apploader process begins. For example, starting the apploader involves running the apploader.exe file of the apploader. The apploader process is illustrated in dashed box 516.

At block 518, the application virtualizer is downloaded from the virtualized application portal to the client device and/or updated at the client device as needed. In an embodiment, the application virtualizer includes the following components:

1. An appvirtualizer.exe, which is the main virtualizer .exe file (The configuration of this file is dependent on the specific virtualization technique that is implemented. It should be understood that the deployment techniques described herein are applicable to different techniques or "flavors" of application virtualization);
2. An appvirtualizer32/64.dll, which is the DLL that is injected in a child process memory. In an embodiment, the file is an appvirtualizer32.dll for a 32-bit machine and an appvirtualizer32.dll and an appvirtualizer64.dll for a 64-bit machine;
3. An appvirtualizer.clc file, which is the redirections file that has (FROM-TO) rules for the files and registries that need redirection. This file is used by the application virtualizer at launch and is used to perform redirection, which in turn achieves virtualization for child processes; and 4. The appvirtualizer.clc file may include one or more application specific .clc files that have application-specific (FROM-TO) rules. In an embodiment, the ability to include multiple .clc files allows for a modular control of the redirection files, which can help simplify file maintenance.

In an embodiment, the apploader checks for updates to the application virtualization layer components using checksum comparisons of checksums stored and/or generated at client device with checksums obtained from the virtualized application portal. By using checksum comparisons, only those components that the client device does not already have or components that need to be updated are downloaded to the client device.

At block 520, encrypted binaries needed to run the application are downloaded from the virtualized application portal and/or updated from the virtualized application portal. In an embodiment, application binaries are files whose content is interpreted by the operating system and/or processor(s) of the client device. For example, the application binaries may be identified as ".bin" files. In an embodiment, the application binaries are specific to a processor, e.g., specific to either a 32-bit processor or a 64-bit processor. In an embodiment, the specific application binaries that are downloaded to a client are determined on the fly (e.g., during the apploader process) and are dependent on the configuration of the client device, e.g., 32-bit binaries are downloaded for a 32-bit machine and 64-bit binaries are downloaded for a 64-bit machine. Although in this case, the application binaries are encrypted for security, in other embodiments, the application binaries may not be encrypted, e.g., when security is not as much of an issue. In an embodiment, the apploader checks for updates to the application binaries using checksum comparisons of checksums stored and/or generated at client device with checksums obtained from the virtualized application portal. By using checksum comparisons, only those application binaries that the client device does not already have or application binaries that need to be updated are downloaded to the client device.

At block 522, the binaries are extracted to a virtual file system. In an embodiment, the binaries are compressed and password protected. In an embodiment, the binaries could be grouped into multiple .zip files, which gives flexibility to logically couple files relevant to certain aspects of the application. For example, files related to the services could be combined into the same .zip file while the main application files and their dependencies could be combined into a different .zip file.

At block 524, shortcuts and file type associations are registered. In an embodiment, the files/registries are written in a user profile area so that the file association is visible to the operating system. In an embodiment, shortcuts are unconditionally created/verified because, if the shortcut is the main entry point and if the user does not have, or if the user accidentally modifies or deletes the shortcut, it may not be possible to run the application. Further, if the installation gets corrupted due to external modifications to the virtualized files and registries, then a user may still be able to delete all of the files and registries from the virtual area and re-download the files from the virtualized application portal to reset and fix the virtualized application.

At block 526, virtual registry variables and virtual environment variables are configured and/or updated. For example, this process may involve unzipping the registries stored as a .ZIP file and then configuring the registries in the config. Next, the configured registries are installed in the virtualized area in the registries. For example, in an embodiment, during packaging, entities that are coupled to the operating system are abstracted as variables, e.g., variable "ProgramFilesX86" refers to the "program files" area of the operating system and may be different on different operating systems. In the configuring step, all such variables are replaced with concrete values obtained from the client machine. For example, "ProgramFilesX86" may be replaced with "c:\program files" if the client device is a 32-bit machine, but "ProgramFilesX86" may be replaced with "c:\program files (x86)" if the client device is a 64-bit machine.

At block 528, a predefined workflow is applied to install the virtualized application. In an embodiment, the predefined workflow is applied using client environment information and/or custom fields. For example, client environment information may include any configuration information related to the client, e.g., hardware and/or software configurations. In an embodiment, the applauncher can be configured such that a desired workflow is followed before a virtualized application is started. The existence of the predefined workflow provides great flexibility in how a particular application is to be configured, thus enabling the application to be configured on the fly or on demand. For example, for a particular application, it may be desirable to check and start a particular service. A service is typically a component which is supposed to run and be visible across sessions. Many legacy applications have various services, which are used for delegating operations such as licensing or other background tasks. A service is generally started with the client machine, thus many applications assume that the service is running when the application starts, or the application is not able to start without the service running in the background in the first place. For example, a licensing service may be used to track licensing of a software component. When a user clicks a shortcut to start a particular application, the application first checks to determine if the licensing service is running to determine if the user is licensed to use the application. If the licensing service is not found to be running, then the application would not be able to start or would return a message that indicates a licensing problem. A service can be started in this process by, for example, using the actions in the workflow to check if certain files are copied and start the service if the service is not already started. In another example, the workflow may specify that certain special installation steps (e.g., database initialization) be implemented during a first installation at the client device. For example, as part of the process, a check is done to see if the installation is the first installation and if so, the special installations steps are implemented.

In an embodiment, the predefined workflow involves using custom fields to configure a Variable:Value pair at the virtualized application portal that can be used as variables while the installation process is implemented at the client device. For example, for a single package of Internet Explorer, two different customers may want to start with a different page as the starting page in Internet Explorer. Providing different starting pages for different customers can be implemented by using custom fields, making the URL as a custom field and then configuring the custom field as per the user requirement on the portal server. Thus, the URLs can be set as URL=CustomerA.com for Customer A and URL=CustomberB.com for Customer B. In another embodiment, a single package may be used to connect to different databases for two different customers. For example, custom variables can be defined on the virtualized application portal, such as DatabaseMachineName/IP, DatabaseName, PortNumber, and username. A Variable:Value pair is also created on the virtualized application portal, such as Data- BaseIP=192.168.3.10, DatabasePort=1443. According to the predefined workflow, the apploader will read the key value pairs and keep the key value pairs in its memory as new variables to expand. When the apploader reads the workflow engine config (e.g., apploader.clc), the apploader will find any variables that are present in the config, before executing any action. An example pseudo-code for this operation is as follows:

```
<SyncZipFilesAction Id="DownloadAddOns"
UserMessage="Downloading !appname!">
    <Results>
        <Result ResultText="*" ResultAction="DownloadGECBLiveAAV"
EndScript="false" />
    </Results>
    <ZipFiles>
        <ZipFile SkipChecksum="false" UsePostponedUpdate="false"
Password="$a6a8!af08-ad" ClearExtractFolder="false">
            <LocalPath>%DefaultDir%\GECBAddons.clz</LocalPath>
            <ServerPath>%GUID%/!Version!/GECBAddons.clz</ServerPath>
            <ExtractFolder>%DefaultDir%</ExtractFolder>
        </ZipFile>
    </ZipFiles>
</SyncZipFilesAction>
```

In this config, the !appname! is a variable that will be replaced by the apploader with the name provided in the custom fields. Similarly, the !Version! field is a variable that will be replaced by the apploader with the name provided in the custom fields.

In another embodiment, the predefined workflow utilizes a Variable:Value pair that is configured at the virtualized application portal. For example, the Variable:Value pair is URL=CustomerA.com. When the apploader.exe file starts to execute, the apploader requests the virtualized application portal to provide a list of all the custom fields that are configured for the corresponding user and the virtualized application portal returns the Variable:Value pairs configured for the corresponding user. The apploader stores the Variable:Value pairs in the local memory of the client device as extra variables to be replaced. Then, the apploader goes through package-specific apploader configs searching for an occurrence of the custom fields and then replaces the custom fields with the corresponding Value. In an embodiment, the operation is performed prior to execution of the action itself, thus the original action:

Run Application c:\PF\IE.exe % URL %" will become;
Run Application c:\PF\IE.exe CustomerA.com As described above, variables in the apploader config can be replaced on the client machine at runtime as per the values that are set up on the virtualized application portal or depending on information available at the client device (e.g., 32-bit or 64-bit machine). The same or similar approach could be used to, for example, download a completely different package depending on the operating system of the client device using custom fields. For example, if the operating system of the client device is WINDOWS 7, then a package specific to WINDOWS 7 is downloaded (e.g., a Win7.zip file) and if the operation system is other than WINDOWS 7, then a package applicable to other versions of WINDOWS is downloaded (e.g., a Standard.zip file). The same or similar approach could be used to, for example, implement version control by changing the location from which the apploader downloads files depending on a predefined configuration. For example, version 1 of an application can be located in a first location and version 2 of the same application can be located in a second location, with the location being determined by the Variable:Value technique described above. The same or similar approach could be used to, for example, configure database ports and connection strings, configure different license keys, specify MICROSOFT OFFICE, browser plugins to be installed for a user or group of users, specify a language pack to be deployed, and specify a URL for a Web page, video, etc. Although some examples of the predefined workflow are described, the predefined workflow can implement other operations to configure a virtualized application.

At block 530, a custom workflow can be run to install the virtualized application. In an embodiment, the applauncher has the ability to launch .exe files as part of the supported actions. Therefore, the workflow can be fully extensible with any steps a user may want to incorporate into the launching of a virtualized application. For example, a user may want to unconditionally launch a service (such as a license tracking service) as a prerequisite for the application to start. Such a service can be started launching a "licenseservice.exe" file. The custom workflow is a flexible operation that can be configured on, for example, a per-application, per-customer, per-system basis. With the ability to launch external executable files, a customer could even customize the process by, for example, specifying the launch of a custom program, a script, or an execution action and/or by doing file or registry checks.

In an example, the custom workflow may involve downloading and installing run-time environments such as, for example, .NET 3.5, JAVA virtual machine 6, and/or "msvcr." For example, "msvcr" is a MICROSOFT element that includes the runtime redistributables that are distributed as prerequisites for some applications to run in a WINDOWS environment. Applications created using a compiler tool such as MICROSOFT VISUAL STUDIO need runtime components that correspond to the specific version of the compiler tool. When deploying virtualized applications, the msvcr component corresponding to the specific version of VISUAL STUDIO may not be present. For example, a file with the same name may reside in the WINDOWS "System32" directory of the operating system, however, the versions of the msvcr file differ on different operating systems, and are not fully compatible with all of the previous versions. To address problems that may occur due to incompatible versions of the compiler tool, in an embodiment, the relevant DLLs needed to run a particular application are virtualized or provisioned in a virtualization package, which is stored at the virtualized application portal, so that the virtualized application will run at the local client device with no issues with the msvcrt or the C language runtimes. Although some examples of the custom workflow are described, the predefined workflow can implement other operations to configure a virtualized application.

At block 532, if needed, dependencies can be virtualized. For example, .NET 3.5 may be needed for certain applications and can be virtualized and installed on the client device. In an embodiment, certain dependencies (e.g., runtimes, frameworks, etc.) are "pre-virtualized" and included in a virtualization package of an application if it is found that the application needs the component (i.e., is dependent on the component) to run. With a pre-virtualized dependency incorporated into a virtualization package of an application, the virtualized application can be run on a client machine irrespective of whether a particular dependency (e.g., runtime, framework, etc.) is already installed on the client machine.

At block 534, a secure license token is requested from the virtualized application portal. In an embodiment, the secure license token enables the application binaries to be decrypted so that the decrypted binaries can be executed by the client device. Dispensing secure license tokens from the virtualized application portal enables use of the applications to be centrally controlled. Although this technique involves using a secure license token for secure deployment of applications, in other embodiments, security may be less of a concern and a secure license token may not be needed.

At block 536, a monitoring process is started at the client device. In an embodiment, the monitoring process involves monitoring licenses and usage. For example the monitoring process can track the number of licenses in use by the client device so that the virtualized application portal can manage the number of licenses in use versus the number of licenses available for use. The monitoring process at the client device can track parameters of usage such as the number of hours of usage, the date/time of usage, who is using the virtualized applications, what departments are using the virtualized applications, etc. Information collected about licenses and usage can be reported in various different ways. In an embodiment, the monitoring process is implemented at the client device via a monitor element (324, FIG. 3) that is downloaded from the virtualized application portal during the apploader process and executed at the client device. In an embodiment, monitoring information from, or about, application usage at the client device is provided to the virtualized application portal for centralized monitoring and management.

At block 538, the binaries of the virtualized application are decrypted and the virtualized application is started. In an embodiment, the application binaries are decrypted using the secure token that was obtained from the virtualized application portal.

At block 540, monitoring information that is generated locally at the client device is reported to the virtualized application portal on an as needed basis.

In an embodiment, implementation of the launcher process 516 results in a launch icon or "shortcut," being added to the graphical user interface of the client device. For subsequent uses, the virtual application can be started directly from the shortcut on the client device without having to navigate a browser to the virtualized application portal. With reference to FIG. 5, if a virtual application has already been run on a client device, at user action 544, a user initiates the virtual application by, for example, double-clicking on the corresponding desktop shortcut that was previously installed on the desktop of the client device during the launcher process. Double-clicking on the desktop shortcut starts the apploader process, e.g., begins execution of a .exe file of the previously downloaded apploader. At operation 546, the apploader implements a checksum comparison and file update process similar to that described with reference to operation 512 and with reference to FIG. 6. Once the apploader files are confirmed to be up to date, then the apploader is started (e.g., by running the apploader.exe file) and the process proceeds to operation 518 and continues as described above.

In an embodiment, using the above-described technique, a virtualized application can be deployed on demand in a manner that is responsive to at least three different factors. For example, deployment of a virtualized application is a function of the specific configuration of the client device (e.g., 32-bit or 64-bit, language requirements, etc), the specific entitlements established at the virtualized application portal (e.g., application assignment and available licenses), and the application package that has been prepared and stored at the portal so that the virtualized application runs in a contained way without conflict with other applications that exist on the client device. Using the three different factors, a virtualized application is composed "on the fly" at the time the application is requested to be run using the launcher, the apploader, and the virtualized application portal.

As described above, a feature of the deployment technique is that the launcher.exe file performs a limited number of functions, and therefore, the launcher can get by with simple programming code, e.g., C. It was recognized that with a small, relatively simple executable file, the process for launching a virtualized application could be started easily and reliably on a wide variety of client devices. This approach is in contrast to using a one size fits all packaging approach (in which code for every possible configuration of a client device is addressed, which would result in a huge package to accommodate different configurations and still may not even run on some systems) or a system-specific packaging approach (which, in an enterprise environment, could result in a large number of unique packages to accommodate all of the different configurations and capabilities of the client devices). The small and relatively simple launcher.exe file is then used to bring up the .NET framework (if not already installed) and to download and start the apploader.exe file, which performs more complex and advanced functions that depend on the .NET framework.

Figure 7:
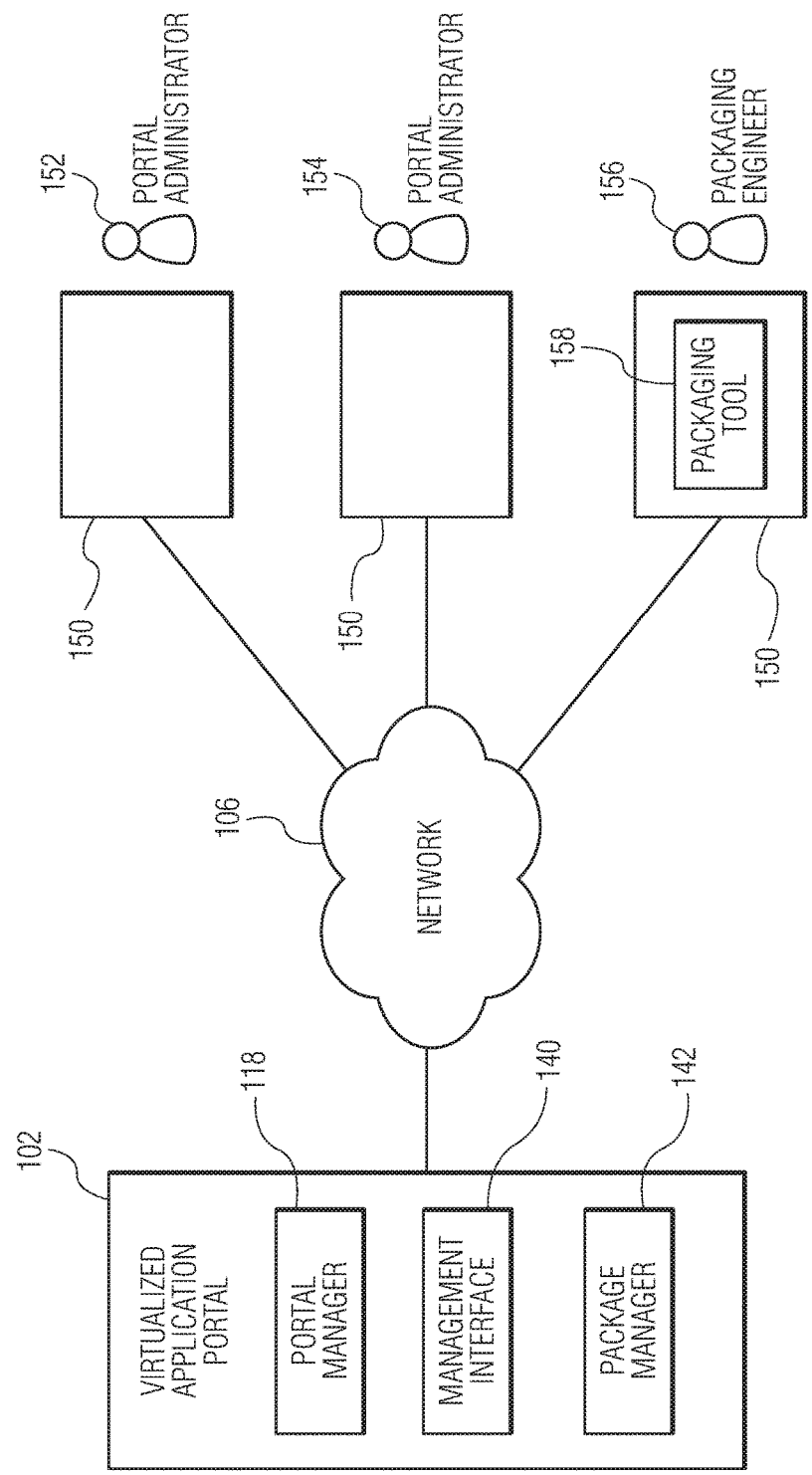
FIG. 7 illustrates an embodiment of a virtualized application portal that includes a customer administrator, a portal administrator, and a package manager.

An example of a process for launching a virtualized application is described above with reference to FIGS. 3-6. As described above, virtualized applications are hosted by the virtualized application portal. In an embodiment, the virtualized application portal is configured to support various application management operations such as package management, application management, and customer administration. FIG. 7 illustrates an embodiment of a virtualized application portal 102 that includes a portal manager 118, a management interface 140, and a package manager 142. The virtualized application portal can be accessed by client devices 150 (e.g., that are similar to client devices 110), which are connected to the virtualized application portal through a network. For example, the virtualized application portal can be accessed by a portal administrator 152 through a client device, by a customer administrator 154 through a client device, and by a packaging engineer 156 through a client device.

The virtualized application portal 102 enables centralized management and distribution of virtualized applications to client devices via the network 106. An advantage of deploying virtualized applications from a virtualized application portal using the above-described technique is that the virtualized applications can be downloaded and used on an as-needed basis. That is, only the users that want to use a particular application will chose to launch the virtualized application. Such an as-needed deployment scheme has several benefits in an enterprise environment. For example, in a typical enterprise environment, the information technology (IT) administrator with either customize the application configuration for each unique department and/or user in the enterprise or the IT administrator will give each department and/or user in the enterprise the same application configuration. However, customizing the application configuration for each unique department and/or user can lead to a large number of custom configurations and can be very time consuming and difficult to administer while giving each department and/or user the same application configuration can be extremely wasteful, for example, when paying for software licenses on a per-installation basis while some applications will never be used on certain client devices.

Examples of features of the virtualized application portal are described below. In an embodiment, the portal manager 118 can provide functionality such as customer management, application control, version control, access control, and reporting management.

In an embodiment, customer management may involve allowing customers to be managed, e.g., added and deleted from the virtualized application portal. FIGS. 8A and 8B depict an embodiment of a graphical user interface that is displayed within a browser that can be used to manage customers. Information can be managed for each customer that is set up in the virtualized application portal. For example, customer information may include the customer name, a customer URL, a data location, service pack identifier, a listen address, a listen port, a send address, a send port, an instance config file name, a config version.

Once a customer is set up, the portal manager 118 can be used to determine which virtualized applications will be made available to the customer's users. For example, the customer gives users access to a suite of virtualized applications based on certain user criteria. For example, users from the accounting department may get access to an accounting application, users from the engineering department may get access to a project management application, and users from both the accounting and engineering department may get access to productivity applications (e.g., email, calendar, and contacts) and media applications (e.g., ADOBE READER and VLC media player). Additionally, the portal manager can be used to manage license usage, for example, of a particular customer. In an embodiment, a customer has obtained a limited number of licenses for products and the use of the licensed products is tracked and controlled so that the limited number of licenses is not exceeded. In still another embodiment, the use of licensed products is tracked and fees are paid on a per-usage basis. In still another embodiment, the customer may have access to an unlimited number of licenses, but license use is still tracked. FIGS. 9A and 9B depict an embodiment of a graphical user interface displayed within a browser that is used to manage virtualized applications and licenses of the virtualized applications at the virtualized application portal. As depicted in FIGS. 9A and 9B, the graphical user interface includes a column of application names and columns that include license information and columns that include usage information. For example, the graphical user interface displays columns for "Total licenses," "Available Licenses," "License Type," "Available to Assign," and "Licenses in use." In the embodiment of FIGS. 9A and 9B, the graphical user interface indicates virtualized applications that are available to be assigned to users and/or a particular user as "Available Apps" and virtualized applications that have been assigned to users and/or a particular user as "Assigned Apps." Additionally, the graphical user interface includes a column that identifies an offline allowance (e.g., in minutes). The offline allowance enables the virtualized application to be used for the designated period of time (e.g., measured in minutes) while the client device is offline (e.g., does not have Internet access). As described above, in an embodiment, the application binaries are stored on the virtualized application portal as encrypted files and are downloaded to the client devices as encrypted files. Encrypting the binaries ensures that the binaries cannot be moved to another client device and run without going through the virtualized application portal to validate the license and ensures that the client device has a valid offline license for the client device that attempts to run the virtualized application in an offline mode. As indicated in FIG. 5 above, in an embodiment, a secure license token is requested from the virtualized application portal each time a virtualized application is run from a client device and if the corresponding license has an offline allowance then the secure license token is stored on the client device in an encrypted store. This ensures that virtualized applications cannot be decrypted and run without a valid license but can be used offline for a specified time.

In an embodiment, each time a virtualized application is run at a client device, the launcher process causes the version of the virtualized application to be checked at the virtualized application portal against a specified version for the user. An updated version and/or different version of the virtualized application can thus be provided to a user on a per-usage basis. Version control checks upon each application launch allows for granular version control of what users get what version of an application and allows for multiple different versions of the same application to be used simultaneously across the enterprise, if desired. The version control system can also be used to ensure that all users are always updated with the latest version, thus reducing the number of old versions of a virtualized application that have to be supported. The updating of virtualized applications can have additional logic applied so that the updating is coordinated with events such as server updates.

In an embodiment, the virtualized application portal can provide application monitoring features. For example, usage can be monitored on a per-application basis, a per-customer basis, a per-user basis, and/or a per-client device basis. Usage information can be provided in various formats and in various graphical user interfaces. FIG. 10 is an example embodiment of a graphical user interface displayed within a browser that is used to report application usage. The graphical user interface includes a drop down report selection menu, fillable application usage date fields, and columns of usage information. In an embodiment, the columns of usage information include an application name, a customer name, a user name, a machine name, a start time (in UTC), an end time (in UTC), a duration of use, a start year, and an IP address of the machine on which the application was run. In an embodiment, the reporting information can be searched, sorted, and manipulated. Usage information can be helpful in many aspects of application management. Although an example of reporting is described above, reporting of different application usage and/or licensing information and reporting of other information related to the virtualized applications can be generated, managed, and/or reported via the virtualized application portal.

In an embodiment, the package manager provides support for "packaging" applications so that a virtualized version of the application can deployed to client devices. In an embodiment, application packaging involves creating distributable bundles of application files, registry keys, INI files and all other entities that are needed for an application to function correctly in, for example, a WINDOWS operating system environment. The bundles of application files, registry keys, INI files, etc. are referred to as "application packages" or simply as "packages." Techniques for packaging applications for deployment as a virtualized application are known in the field. In one embodiment, the package manager is a web application (i.e., accessible via browser) that can be used by a packaging engineer to package applications. In an embodiment, a client device 150 may include a packaging tool 158 that is configured to package applications and/or to support packaging of applications. For example, an application can be packaged by the packaging tool on the client device and uploaded to the virtualized application portal.

The above-described virtualized application deployment technique enables applications to be used anywhere and the technique in general and/or the software, or software components, configured to implement the technique may be referred to herein as "applications anywhere." Applications anywhere simplifies the cloud enablement of, for example, enterprise applications. Using this technique, legacy on premise client server and desktop applications can be delivered as cloud applications without needing remote desktops or re-development of applications, which enables consolidation of supporting infrastructure, improved agility, and reduced total cost of ownership. An example implementation of the technique is described below. However, the scope of the invention is not to be limited to the specific forms or arrangements of parts so described. The scope of the invention is to be defined by the claims and their equivalents.

The technique enables cost effective delivery of WINDOWS rich client applications to users in an enterprise. Complexity of testing and deployment is reduced while providing users with a private or public cloud application portal experience. The virtual application portal can be centrally managed, thus streamlining version control for all virtualized applications while centrally managing licensing and usage. As described above, virtual applications are dynamically configured with the appropriate settings for each user from a single central package. This enables secure bring your own device (BYOD) implementations and application entitlement.

The technique allows for distributed environments to be consolidated and run from a centralized cloud or data center. The above-described virtualized application deployment technique allows WINDOWS client applications to be deployed from the cloud using a simple click and run technology, no matter how complex the application, or what language the application was written in. For example, no changes are made to the source code of the application and the application is deployed to a client device without needing to be natively installed at the client device.

In an embodiment, the virtualized application portal enables centralized control of licenses and versions. In an embodiment, the applications are virtualized with no administration rights and no pre-installed components on the target machine.

In an embodiment, a user of a client device navigates to the virtualized application portal and logs in, either using the portal user management interface or a single-sign on with support for multi-tenant Active Directory or lightweight directory access protocol (LDAP) integration. The user is then presented with a list of the virtualized applications to which the user is entitled to use.

An administrator of the virtualized application portal can manage which applications are available to users or groups of users and how many licenses are available. An administrator can also manage what version of the virtualized application is delivered to the users.

When the launch button is clicked, a small .exe file is downloaded which the user then runs. For example, the launcher allows any machine to be initiated without any required dependencies other than WINDOWS XP SP3 or later. The launcher.exe is also used to pass the context from the browser to the local machine which contains a secure token that is used to track the user ID and the app they were launching.

The launcher then prepares the machine to run the full applications anywhere deployment process, this is done by detecting if .NET 4.0 is installed on the local machine and downloading the .NET 4.0 virtual package if it is required and not already installed. It then starts downloading applications anywhere. In an embodiment, applications anywhere is a .NET 4.0 C# application but uses the virtualized .NET package if it is not already installed. This allows applications anywhere to run on any machine without any pre-requisites or requiring local administrator rights. A branded splash screen for the application that is being launched can be shown while the launcher runs and continues to show during the applications anywhere process.

Applications anywhere then goes through the process to deploy the virtual application to the local machine. This can be done using a deployment scripting engine within applications anywhere. In an embodiment, this script goes through a process as described above.

In an embodiment, the launcher process completes by starting the apploader. When the apploader runs, it places shortcuts either on the desktop, start menu or both depending on the package configuration and creates any required file associations. These can then be used to launch applications anywhere directly without requiring the launcher. The launcher is only typically used once per application to create the virtual environment.

Once the apploader starts, the first task is to ensure that the binaries required to start and run the target application are downloaded, or if the application has been run before, to check if any updates are required. Updates can be delivered as a delta to speed up the process of updating so that only the required parts of the application that have been changed are updated. The binaries are downloaded in an encrypted and compressed archive and then extracted on the local system. All files that are downloaded can be cached in the local environment. The local cache can be set to persist or be temporary depending on the requirements of the application and the environment.

The files that are downloaded contain the footprint of everything that the application would need to run normally, although the contents of the files can be delivered on demand where appropriate. The files can be encrypted where necessary (e.g., .exe files are encrypted by default) so that they cannot be launched without using the launcher to validate the version, license, and configuration. Once the application binaries are downloaded, the shortcuts and shell extensions are registered, so that the application can be launched again as the same portal user without going back to the portal.

The process described herein supports the unique concept of dynamic configuration of applications. Any number of dynamic configurations can be applied at run-time. For example, if the package is run on a 32-bit machine, the 32-bit binaries can be downloaded and on a 64-bit machine the 64-bit binaries are downloaded, or for example, on a machine with the French language installed, a set of French binaries or language extensions can be automatically applied. Dynamic configuration can also change files (.xml, .ini etc.) or registry settings within the virtual package so that individual machines or users can automatically receive specific configuration parameters.

In an embodiment, during packaging, any runtime requirements (for example .NET framework versions, JAVA versions etc.) are added to the package by a packager. When the launcher runs the package, it first verifies if the required runtimes are available on the target machine, if they are not available then the runtimes are virtualized for the target application. This speeds up the time of initial deployment of an application and reduces the amount to be downloaded for components that are already installed. If the runtimes are already installed then the local versions are used and the virtual versions are not downloaded. Once a runtime has been virtualized on a target machine it is available for all the packages that are run on that machine.

In an embodiment, applications anywhere packages are encrypted to ensure that they cannot be moved to another machine and either run without going through the virtualized application portal to validate the license or having a valid offline license for that machine. Applications anywhere requests a license from the virtualized application portal each time the app is run and if the license has an offline allowance then this token is stored on the local machine in an encrypted store. This ensures that applications cannot be decrypted and run without a valid license but can be used offline for a specified time.

In an embodiment, the target application is then started using any of the specified entry points, such as shortcuts or file associations which are invoked when documents are opened. When the application runs, any changes that are made are persisted on the local machine so future executions of the application can make use of those changes. Local files such as "My Documents" are typically defined to be outside of the virtual environment so these calls are allowed to go through to the local file system.

During runtime the application is tracked so that usage statistics can be reported back to the virtualized application portal. The usage data includes details on the user, machine, and application and how long the application was used for. Specific usage statistics can be supported for more granular reporting, if required.

Client side virtual environment—In order to run WINDOWS applications without them being natively installed, applications anywhere is able to intercept the WINDOWS API calls that applications make to interact with the local operating system. This allows a virtual file system and virtual registry to be created for the application, which is layered on top of the local file system and registry. This approach means that the target application can "see" a combination of the virtual and local file system and registry, and it is very light weight with little to no performance impact on the application or local machine as it is not running a full virtual operating system.

In an embodiment, the files have a virtual file system configuration that determines how the target application "sees" the file system when it runs. For example, an application might require its files to be in "C:\Program Files\Application Vendor\Application Name" or C:\Windows\System32\AppName.ini", these files are virtualized so that when the application looks for files in "C:\Program Files\Application Vendor\Application Name" the file system API calls are redirected to the applications anywhere virtual file system, but calls outside of the defined configuration are allowed to go through to the local file system (e.g., "C:\Users\UserName\Documents.").

In an embodiment, WINDOWS applications can also make use of the registry in a similar way to the file system, registry calls which are included in the virtual registry configuration are redirected to a known location within HKEY_CURRENT_USER\Software\Cloudhouse, and other calls are allowed to go through to the local registry.

Click & Run applications—In order to deploy the target application to a new machine, the end user just needs to run the small launcher.exe file. This can be pulled on-demand from the virtualized application portal or deployed using push deployment technologies. In an embodiment, the splash screen will display, informing the user of the progress of the application deployment. Without any interaction required by the user, the target application will deploy and start within a few short minutes.

Each subsequent time that the application is run, it can be started by using the shortcuts placed on the desktop and start menu or by opening an associated file (this can be configured during the packaging of the application).

No player or plug-ins required—Applications anywhere does not require any preinstalled player, drivers or other dependencies to run. For example, a user can go to any machine with WINDOWS XP SP3 onwards with nothing else installed and Click & Run any application that is set up in the virtualized application portal.

No administrator rights required on the client system—In an embodiment, applications anywhere has a user-mode application virtualization engine which allows the deployed target application to be run without being natively installed on the client device. This means that the end user does not need any local administrator right and can be fully locked down using group policy. For example, nothing is written to the system in any of the protected areas so all that is required is the basic permissions to write to the C:\ProgramData\Cloudhouse folder (or C:\Documents and Settings\All Users\Application Data\Cloudhouse on WINDOWS XP) and the HKEY_Current_User\Software\Cloudhouse registry key which all users have by default.

Full integration with any local devices—Traditionally, user-mode application virtualization solutions have been tightly sandboxed and unable to break out of their virtual environment to integrate with local devices. Local integration has previously only been possible using kernel-mode solutions, which require an administrator to install and manage drivers or players.

The applications anywhere user-mode application virtualization engine is unique in its ability to support integration from the virtual application to any local device without needing to worry about what the devices are or managing any drivers.

Full integration with any locally installed apps—A more complex issue is supporting integration between the virtual application and local or other virtual applications. This is again something that cannot normally be done with User-Mode application virtualization solutions. Applications anywhere is unique in its ability to support integration from the virtual application to any locally installed application or other applications anywhere virtual applications. This works without specific configuration and does not require any prior knowledge of what the locally installed application is or what version it is. For example, if the virtual application has a button to launch MICROSOFT WORD, it is able to access the local registry to find out what version of WORD is installed, where it is installed and then has the ability to launch the application.

Support for inbound application integration and MICROSOFT OFFICE Plugins—Applications anywhere also supports inbound integrations from locally installed applications by automatically hooking into locally installed processes (either all processes or specific processes). For MICROSOFT OFFICE applications (Word toolbars etc.) there is a plugin that can be automatically set to load by applications anywhere each time a MICROSOFT OFFICE application starts.

Advanced protection—In an embodiment, in order to ensure that the virtualized application cannot be moved/copied to another machine or launched without using applications anywhere, critical files are encrypted. In an embodiment, by default all .exe files are encrypted although other files can also be encrypted if desired.

No runtime dependencies, even for .NET applications—In an embodiment, applications anywhere is able to run on any system from WINDOWS to XP SP3 onwards without any required dependencies, pre-installed components or administrator rights. For example, the target application can require any version of .NET and will run on a machine without .NET installed.

Dynamic Configuration during deployment—Applications can be dynamically configured during deployment to allow a single package to work for large number of users. For example, an application may have 32-bit and 64-bit native versions, three multiple language packs, and a different configuration for each geographic location. In an enterprise with three global offices, this would traditionally mean eighteen different packages, with applications anywhere this can be delivered from a single package. The platform is detected during deployment so that the correct 32-bit or 64-bit versions of the files and registry are deployed based on the target system, the system language settings can be used to detect the correct language pack to deploy and the group or company/division of the user in the virtualized application portal can be used to configure any settings in any text based (xml, ini etc.) files or the registry as needed.

Cloud based version control—Each time an application is run, the required version for the user is checked against the virtualized application portal and delivered or updated as required. This allows granular version control of who gets what version of an application and allows for multiple live versions to be managed at once, if needed. The version control system can also be used to ensure that all users are always updated to the latest version, thus reducing the number of old versions in the field that have to be supported. The updating can have additional logic applied so that it is coordinated with any server updates for multi-user applications.

Rationalize Testing from dozens of platforms to a single OS—Applications anywhere virtualization engine decouples the application from the underlying operating system. This allows a single package to run on XP right through to WINDOWS 8.1, and in the future other platforms. This reduces the testing required for any new or updated package from dozens of operating system version combinations to a single operating system test.

Self-healing applications to reduce support overhead—Each time an application is run, it can be checked to make sure it is the correct version for the user but is also checked for consistency to self-heal the application in cases where critical files or registry keys have been deleted or corrupted.

Supported Platforms
WINDOWS XP SP3 or later—x86 or x64 editions
WINDOWS Vista—x86 or x64 editions
WINDOWS 7—x86 or x64 editions
WINDOWS 8—x86 or x64 editions
WINDOWS Server 2003—x86 or x64 editions
WINDOWS Server 2003 R2—x86 or x64 editions
WINDOWS Server 2008—x86 or x64 editions
WINDOWS Server 2008 R2—x86 or x64 editions
WINDOWS Server 2012—x86 or x64 editions
Terminal Services fully supported
Citrix XenApp and XenDesktop fully supported
Virtualized WINDOWS machines running under VMWare, Microsoft Hyper-V, VirtualBox and Microsoft Virtual PC etc.
Supported Development Languages
C/C++
Microsoft .NET all languages
Microsoft Visual Basic
Java
Delphi
Pascal
PowerBuilder
COBOL for WINDOWS
MUMP S
Visual FoxPro
Microsoft Access
Security
Web services access can be HTTP or HTTPS
Application files are encrypted using 256-bit AES encryption
License tokens are 256-bit AES encrypted
Technical Specifications
The Initial app launcher is C++, without any C runtime requirements.
Cloudhouse applications anywhere is C#4.0—this can be run without .NET installed as it is virtualized on demand by the Initial app launcher Virtualized application portal—the virtualized application portal is used in conjunction with applications anywhere and provides the web interface to allow configuration of applications, licenses and versions and to view usage reports. In an embodiment, the web interface allows customers to be added in seconds and for any settings that they need to be set instantly. The applications and licenses that are assigned determine what users are able to view when they logon to the virtualized application portal. In an embodiment, the virtualized application portal supports Single-Sign on integration, either via LDAP or SAML for Active Directory using Federation Services. When using Single-Sign on, rights in the portal are managed based on the groups that the users belong to. Usage statistics within the portal, which are gathered by applications anywhere, allow administrators to view important information about who is using which applications. This can also be used to manage the billing for the customer, allowing for new business models like usage based licensing. A full suite of API's allows for integration with existing systems/portals and everything within the portal can be accessed using the API. The portal can be fully co-branded.

Supported Browsers
Microsoft Internet Explorer—v8 onwards
Google Chrome—v15 onwards
Mozilla Firefox—v12 onwards
Apple Safari—v5 onwards
Security
Web portal access can be HTTP or HTTPS
Technical Specifications
The virtualized application portal is a .NET 4.0 C# web application hosted on IIS AutoPackager—In an embodiment, an AutoPackager allows even the most complex of WINDOWS apps to be packaged in a few simple steps. The AutoPackager takes all the complexity out of packaging with a simple user interface and auto publishing to the virtualized application portal. The AutoPackager allows independent software vendors (ISVs) or enterprises to package their own applications and publish them to the virtualized application portal. Features of the AutoPackager include:

Simple and intuitive interface for packaging apps
Snapshot based capture of app installation—collect the files and registry changed made by the app install
Intelligent filtering to exclude unnecessary files and registry changes
Auto Publishing to the virtualized application portal Recommended to package on a clean WINDOWS 7 x86 VM with all .NET versions installed for best operating system compatibility Auto detect of .NET runtimes—no need to package .NET with the app Support for packaging native x86 or x64 apps Automatically self-updates to the latest version Supported Platforms for Packaging WINDOWS XP SP2 or later—x86 or x64 editions WINDOWS 7—x86 or x64 editions Virtualized WINDOWS machines running under VMWare, Microsoft Hyper-V, VirtualBox and Microsoft Virtual PC etc.

Technical Specifications

AutoPackager is C#

AutoPackager enable simple packaging and publishing of applications

Server based computing displacement—Most client server applications are designed on the assumption that the clients and server(s) will be on the same LAN. This means that when the back end servers are centralized it is normally assumed that the clients need to be moved to the central location as well. This has meant that the typical way for centralizing or hosting a client server application has been to use Server based computing (SBC) to host the clients near the servers.

SBC requires the client application and an underlying WINDOWS operating system to be running in the data center or cloud. This means that expensive servers have to be bought and maintained to run the client operating system (or a server operating system shared to behave like a client operating system). This also means that there is a duplication of all the licensing for WINDOWS, and often MICROSOFT OFFICE, as well as the SBC licensing and many third party applications like anti-virus, management tools etc. Given that the end user likely already has a perfectly good WINDOWS machine that is already licensed, has MICROSOFT OFFICE, and all the compute power needed to run the application, this can be expense and resource intensive.

The architecture of a distributed client server application allows for a dramatic reduction in total cost of ownership (TCO) as all of the above doubling up of hardware and licensing is no longer required. All of the SBC infrastructure is no longer needed, representing typically half or more of the infrastructure required to host an application. There can be significant savings in hardware/infrastructure, hosting costs (co-location, rack, power, or cloud fees), licensing savings, lower support resources and more.

Furthermore, SBC can have some drawbacks with getting a remote application to integrate with the users local devices and applications. This means that often only limited devices can be supported, thereby reducing the functionality of the application. For example, printers are often a problem, and scanners or USB or legacy devices are very problematic.

Integrating with local applications from SBC can be difficult, so the user is presented with a disjointed experience where even basic integrations like sending an email from the hosted application, require a remote version of OFFICE, which does not have the same configuration as the users local OFFICE. More advanced integrations are just not able to work at all, this can removes the ability for the rich eco-system of partner applications that go alongside most major line of business applications to work in an SBC deployment.

The above-described architecture for deploying virtualized applications allows for a relatively low TCO for hosting of centralized client server applications, with an excellent user experience and no loss of functionality in the application.

Self-service virtualized application portal—Traditionally there have been three main approaches to distributing software to users. Send an engineer to the desktop to install the software, get the end user to download the installer (or load from CD/USB) and manually install the application themselves, or to use centralized push based deployment. Sending an engineer is an incredibly expensive and very slow process. Getting users to self-install can cause a large amount of support issues, can give a poor user experience, and is not possible in many environments where users are not able to be local administrators of their machines. This means that most enterprises have resorted to pushing applications to user's machines from a central deployment system. Most ISVs still provide their applications as installers that either the end users download and install or an enterprise has to repackage into another format to allow automated push deployment. Therefore, providing applications from a self-service applications store that allows users to just Click & Run can translate to a significant reduction in the cost of support and a much better user experience. Also, the ability to control licenses and get usage statistics allows for greater information, control and even new business models. Push deployments create a large amount of complexity in the packaging process as the package has to work on all the various devices it will be pushed to, or multiple packages have to be maintained, this leads to a high TCO for these solutions. With the ability for applications anywhere to create a single package that is dynamically configured to the target machine during deployment, the costs of packaging and maintaining packages is greatly reduced. Due to the complexity of deploying applications using push technologies and the risk of conflicting applications, most enterprises push a common set of applications to all machines or machines within a certain department, based on assumptions of what applications various users will require for their roles. This can be very inefficient, both in terms of supporting these machines with many applications deployed to them and in terms of the costs of licensing and deploying often unnecessary applications. A self-service applications store where applications are only deployed on demand from the end user when they really need them there, can lead to a significant reduction in unnecessary licensing. For example, in an engineering company that is run using MICROSOFT Project, rather than deploying Project to all machines just in case they need to work on the project plan, users can just self-serve Project when they need it or if they only need to view the plan self-serve the free Project viewer. License tracking and reporting allows ISVs to ensure customer are only able to use what they have paid for and allows enterprises to only license the applications they are really using. The audit trail of license usage gives detailed reporting to ensure that any vendor license requirements are complied with. ISVs are able to use these controls and reports to create new business models for selling their software, supporting any conceivable model from basic subscription to feature based billing.

Legacy Web Application Compatibility—Many web applications that were built in the last ten years or more were not built using the latest HTML5 capabilities, therefore, to get the full functionality requires some local dependencies on the desktop. This could be a particular browser version, browser configuration, plugins, ActiveX controls, JAVA runtimes etc. These applications therefore have the same level of complexity and issues as would be experience with deploying and supporting a full client application. Applications anywhere's unique combination of user mode application virtualization with its ability to provide total local integration and dynamic configuration means that these issues can be solved. When the user goes to the web applications logon page, the local machine will be checked to confirm that it has all of the required local dependencies, and any that are missing can be virtualized without administrator rights and integrated with the remaining local components. This allows the life of these legacy web applications to be extended without redevelopment as the user will always have the right components needed to run the application.

Some benefits of the above-described approach include:
- A way to provide complex WINDOWS applications with a simple "Click & Run" from an virtualized application portal. Allows users to launch applications with no technical knowledge or elevated privileges.
- The unique combination of a user mode application virtualization solution, with total local integration. This allows any application to be deployed without needing administrator rights but for the application to behave like it is natively installed with full integration to and from any other local or virtual applications or devices.
- No player or other pre-requisites. Allows users to instantly run any application without needing to install a player, agent or any other pre-requisites like .NET frameworks regardless of what the application needs.
- Dynamically configure applications during deployment. While an application is being deployed, the configuration is dynamically applied to allow a single packaged version of the application to be deployed to any number of users with varying configurations.
- Granular version control. Control which users get what version of an application and have multiple live versions of an application at any time.
- Support different licensing models. Using the license API integration any type of license model can be used, right down to usage or even feature based licensing.
- Highly scalable native cloud based architecture. Support millions of users globally with an architecture that can easily scale with very low infrastructure requirements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for deploying virtualized applications, the method comprising:
   at a client device,
   downloading a launcher from a virtualized application portal to the client device, wherein the launcher is written in C and wherein the launcher is an executable file;
   running the executable file of the launcher at the client device to execute a launcher process, wherein the launcher process comprises checking for a first dependency and downloading a file of the first dependency if the first dependency is not installed on the client device, wherein checking for a first dependency comprises checking to see if the .NET framework is installed on the client device;
   the launcher process executed by running the executable file further including, after checking for the first dependency, downloading an apploader from the virtualized application portal and starting execution of the apploader;
   running the apploader at the client device to execute an apploader process, wherein the apploader process comprises:
       determining a configuration of the client device and downloading virtualized application components of a virtualized application dependent on the configuration;

determining specific needs of the virtualized application and downloading components dependent on the specific needs; and starting the virtualized application on the client device;

wherein the launcher, the apploader, and the virtualized application include executable files that are separate from each other.

2. The method of claim 1, wherein determining a configuration of the client device involves determining whether the client device is a 32-bit machine or a 64-bit machine and downloading a virtualized application component based whether the client machine is a 32-bit machine or a 64-bit machine.

3. The method of claim 2, wherein the virtualized application components are application binaries.

4. The method of claim 1, wherein the specific needs of the virtualized application are runtime requirements.

5. The method of claim 1, comprising, at the client device, navigating to the virtualized application portal using a browser and initiating a launch button from within the browser to trigger downloading of the launcher.

6. The method of claim 1, comprising, at the client device, running a push agent or an executable file that triggers downloading of the launcher.

7. The method of claim 1, wherein running the apploader at the client device comprises applying a workflow using client environment information.

8. The method of claim 1, wherein running the apploader at the client device comprises applying a workflow using custom fields.

9. A method for deploying virtualized applications, the method comprising:

at a client device, downloading a launcher from a virtualized application portal to the client device, wherein the launcher is written in C and wherein the launcher is an executable file;

running the executable file of the launcher at the client device to execute a launcher process, wherein the launcher process comprises checking to see if the .NET framework is installed at the client device and downloading and installing a version of the .NET framework if the .NET framework in not already installed at the client device;

the launcher process executed by running the executable file further including, after the .NET framework is installed on the client device, downloading an apploader from the virtualized application portal, wherein the apploader is dependent on the .NET framework to run and starting execution of the apploader;

running the apploader at the client device to execute an apploader process, wherein the apploader process comprises:

determining a configuration of the client device and downloading application binaries of a virtualized application dependent on the configuration; and determining a runtime requirement of the virtualized application and downloading components dependent on the runtime requirement; and after the application binaries and the components dependent on the runtime requirement are downloaded, executing at least one of the application binaries to start the virtualized application;

wherein the launcher, the apploader, and the at least one of the application binaries include executable files that are separate from each other.

10. The method of claim 9, wherein determining a configuration of the client device involves determining whether the client device is a 32-bit machine or a 64-bit machine and downloading a virtualized application component based whether the client machine is a 32-bit machine or a 64-bit machine.

11. The method of claim 9, comprising, at the client device, navigating to the virtualized application portal using a browser and initiating a launch button from within the browser to trigger downloading of the launcher.

12. The method of claim 9, comprising, at the client device, running a push agent or an executable file that triggers downloading of the launcher.

13. The method of claim 9, wherein running the apploader at the client device comprises applying a workflow using client environment information.

14. The method of claim 9, wherein running the apploader at the client device comprises applying a workflow using custom fields.

15. A system for deploying virtualized applications, the system comprising:

a virtualized application portal having a plurality of virtualized applications;

a launcher; and an apploader;

wherein the launcher is written in C, the launcher is an executable file, and the launcher is configured to execute a launcher process to check to see if the .NET framework is installed at a client device and to download and install a version of the .NET framework at a client device if the .NET framework in not already installed at the client device and, after the .NET framework is installed on the client device, to download the apploader, wherein the apploader is dependent on the .NET framework to run, and to start the apploader;

wherein the apploader is configured to execute an apploader process to determine a configuration of the client device and to download application binaries of a virtualized application dependent on the configuration, to determine a runtime requirement of the virtualized application and to download components dependent on the runtime requirement, and after the application binaries and the components dependent on the runtime requirement are downloaded, to execute at least one of the application binaries to start the virtualized application;

wherein the launcher, the apploader, and the at least one of the application binaries include executable files that are separate from each other.

16. The system of claim 15, wherein determining a configuration of the client device involves determining whether the client device is a 32-bit machine or a 64-bit machine.

17. The system of claim 15, wherein the virtualized application portal is configured to manage licenses of virtualized applications that are used by client devices.

18. The system of claim 15, wherein the virtualized application portal is configured to provide reports on the usage of virtualized applications by client devices.

* * * * *